(12) United States Patent
Sadot et al.

(10) Patent No.: US 11,025,339 B2
(45) Date of Patent: Jun. 1, 2021

(54) METHOD FOR COMPENSATING CHANNEL DISTORTIONS BY PRE-DISTORTION OF MACH-ZEHNDER MODULATORS, BASED ON SYMMETRIC IMBALANCE

(71) Applicant: B.G. NEGEV TECHNOLOGIES AND APPLICATIONS LTD., AT BEN-GURION UNIVERSITY, Beer Sheva (IL)

(72) Inventors: Dan Sadot, Kfar Bilu (IL); Gil Paryanti, Modiin (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 0 days.

(21) Appl. No.: 16/609,377

(22) PCT Filed: Apr. 30, 2018

(86) PCT No.: PCT/IL2018/050472
§ 371 (c)(1),
(2) Date: Oct. 29, 2019

(87) PCT Pub. No.: WO2018/203329
PCT Pub. Date: Nov. 8, 2018

(65) Prior Publication Data
US 2020/0092001 A1 Mar. 19, 2020

Related U.S. Application Data

(60) Provisional application No. 62/492,196, filed on Apr. 30, 2017.

(51) Int. Cl.
*H04B 10/58* (2013.01)
*H04B 10/079* (2013.01)
*H04B 10/516* (2013.01)

(52) U.S. Cl.
CPC ..... *H04B 10/07951* (2013.01); *H04B 10/516* (2013.01); *H04B 10/58* (2013.01)

(58) Field of Classification Search
CPC ............ H04B 10/07951; H04B 10/516; H04B 10/5561; H04B 10/58
See application file for complete search history.

(56) References Cited

U.S. PATENT DOCUMENTS

| 6,393,083 B1 | 5/2002 | Beukema |
| 2002/0005975 A1 | 1/2002 | Nakamoto |

(Continued)

FOREIGN PATENT DOCUMENTS

WO 2012/163419 A1 12/2012

OTHER PUBLICATIONS

International Search Report for PCT/IL2018/050472, dated Sep. 16, 2018, 5 pages.

(Continued)

*Primary Examiner* — Dzung D Tran
(74) *Attorney, Agent, or Firm* — Roach Brown McCarthy & Gruber P.C.; Kevin D. McCarthy

(57) ABSTRACT

A method for compensating the distortions introduced by impairments of MZMz implementing an optical transmitter, according to which the level of total amplitude and phase distortions caused by the optical transmitter is measured and all impairments in the constellation domain are compensated by pre-distorting the input signal to be transmitted by symmetrically adding imbalance to the voltage applied to the MZM arms. The imbalance is determined by introducing a phase rotation in either I or in the Q path of the optical transmitter, which compensates the total amplitude distortion, and also introducing a phase rotation to both I and Q paths of the optical transmitter, which compensate the total phase distortion and the phase shift caused by compensating (Continued)

the amplitude distortion, until reaching a desired operating point, which corresponds to the level of pre-distortion.

15 Claims, 14 Drawing Sheets

(56) References Cited

U.S. PATENT DOCUMENTS

| | | | |
|---|---|---|---|
| 2008/0170864 A1 | 7/2008 | Nishihara et al. | |
| 2014/0169802 A1* | 6/2014 | Magri | H04B 10/50572 398/183 |
| 2014/0212136 A1* | 7/2014 | Akiyama | H04B 10/532 398/65 |
| 2016/0036533 A1* | 2/2016 | Nakashima | G02F 1/2255 398/187 |
| 2016/0147129 A1* | 5/2016 | Nishimoto | G02F 1/2257 385/2 |
| 2018/0074348 A1* | 3/2018 | Fujita | H04B 10/5561 |

OTHER PUBLICATIONS

Written Opinion of the International Searching Authority for PCT/IL2018/050472, dated Sep. 16, 2018, 6 pages.

Li, G. L, and P. K. L. Yu. "Optical intensity modulators for digital and analog applications." Journal of Lightwave Technology 21.9 (2003): 2010—21 pages.

Sakamoto, Takahide, Akito Chiba, and Tetsuya Kawanishi. "50-Gb/s 16 QAM by a quad-parallel Mach-Zehnder modulator." 33rd European Conference and Exhibition of Optical Communication-Post-Deadline Papers (published 2008). VDE, 2007—2 pages.

Heni, Wolfgang, et al. "108 Gbit/s plasmonic Mach-Zehnder modulator with> 70-GHz electrical bandwidth." Journal of Lightwave Technology 34.2 (2016): 393-400.—8 pages.

Wong, Chi Yan, et al. "Silicon IQ modulator for next-generation metro network." Journal of Lightwave Technology 34.2 (2016): 730-736.—7 pages.

Bao, Yuan, et al. "Nonlinearity mitigation for high-speed optical OFDM transmitters using digital pre-distortion." Optics express 21.6 (2013): 7354-7361.—8 pages.

Ho, Keang-Po. Phase-modulated optical communication systems. Springer Science & Business Media, 2005—13 pages.

Omomukuyo, O., M. P. Thakur, and J. E. Mitchell. "Experimental demonstration of the impact of MZM non-linearity on direct-detection optical OFDM." 2012 IEEE Wireless Communications and Networking Conference (WCNC). IEEE, 2012.—5 pages.

Thian, Mury, and Vincent Fusco. "Power back-off behaviour of high-efficiency power-combining Class-E amplifier." 2011 German Microwave Conference. IEEE, 2011.—4 pages.

Park, Jun Sung, et al. "Power amplifier back-off analysis with AM-to-PM for millimeter-wave OFDM wireless LAN." Proceedings RAWCON 2001. 2001 IEEE Radio and Wireless Conference (Cat. No. 01EX514). IEEE, 2001.—4 pages.

London, Yanir, and Dan Sadot. "Nonlinear effects mitigation in coherent optical OFDM system in presence of high peak power" Journal of lightwave technology 29.21 (2011): 3275-3281.—7 pages.

Barros, Daniel J. Fernandes, and Joseph M. Kahn. "Optical modulator optimization for orthogonal frequency-division multiplexing." Journal of Lightwave Technology 27.13 (2009): 2370-2378.—9 pages.

Omomukuyo, Oluyemi, Manoj P. Thakur, and John E. Mitchell. "Experimental demonstration of digital predistortion for linearization of Mach-Zehnder modulators in direct-detection MB-OFDM ultra-wideband over fiber systems." Asia Communications and Photonics Conference. Optical Society of America, 2012.—3 pages.

Napoli, Antonio, et al. "Novel digital pre-distortion techniques for low-extinction ratio Mach-Zehnder modulators." Optical Fiber Communication Conference. Optical Society of America, 2015.—3 pages.

Peng, Wei-Ren, et al. "Compensation for I/Q imbalances and bias deviation of the Mach-Zehnder modulators in direct-detected optical OFDM systems." IEEE Photonics Technology Letters 21.2 (2008): 103-105.—3 pages.

Chung, Wonzoo. "Transmitter IQ mismatch compensation in coherent optical OFDM systems using pilot signals." Optics express 18.20 (2010): 21308-21314.—7 pages.

Li, Yabo. In-Phase and Quadrature Imbalance: Modeling, Estimation, and Compensation. Springer Science & Business Media, 2013.—73 pages.

Cao, Haiying, et al. "I/Q imbalance compensation using a nonlinear modeling approach." IEEE Transactions on Microwave Theory and Techniques 57.3 (2009): 513-518.—6 pages.

Zhou, Pei-Pei, et al. "A hybird algorithm of two kinds of trust region methods." (2013): 137-140.—4 pages.

Powell, Michael JD. "A new algorithm for unconstrained optimization." Nonlinear programming. Academic Press, 1970. 31-65.—35 pages.

Oppenheim, Alan V., John R. Buck, and Ronald W. Schafer. Discrete-time signal processing. Upper Saddle River, NJ: Prentice Hall, 1999. ISBM 0-13-754920-2. pp. 193-201—9 pages.

Eiselt, Nicklas, et al. "First real-time 400G PAM-4 demonstration for inter-data center transmission over 100 km of SSMF at 1550 nm." 2016 Optical Fiber Communications Conference and Exhibition (OFC). IEEE, 2016.—3 pages.

* cited by examiner

METHOD FOR COMPENSATING CHANNEL DISTORTIONS BY PRE-DISTORTION OF MACH-ZEHNDER MODULATORS, BASED ON SYMMETRIC IMBALANCE

FIELD OF THE INVENTION

The present invention relates to the field of optical modulators. More particularly, the invention relates to a method for compensating channel distortions by pre-distortion of Mach-Zehnder modulators, based on symmetric imbalance.

BACKGROUND OF THE INVENTION

A Mach-Zehnder Modulator (MZM) is one of the main components in modern high rate optical transmitters, used by communication systems. Currently, high-speed optical links use single or dual complex transmitters, each employing an MZM. However the impairments on the MZM may limit performance by increasing its contribution to the overall noise budget, especially when high order modulation schemes such as M-ary Quadrature Amplitude Modulation (M-QAM), M-ary Pulse Amplitude Modulation (M-PAM), or optical orthogonal frequency division multiplexing (O-OFDM) are applied.

These impairments mainly include inherent nonlinearity, and imbalance between the MZM's arms. Another source of impairments include imbalance between the I (In-phase) and Q (Quadtrature) arms of the complex transmitter, which entail amplitude and phase differences, and limit the ability to accurately split the power between I and Q paths. These impairments eventually cause distortions in the transmitted optical signal.

Another type of impairment is associated with the transmitted symbol, since any transmitted symbol (such as 010101 or 11111) is a time dependent signal, which has different spectral components and bandwidth. Therefore, different transmitted data will cause different impairments, which are frequency dependent (since any transmitted symbol has its own frequency/data rate).

Several pre-distortion methods were proposed for compensating MZM impairments. However, these methods do not compensate for all types of impairments and require significant computation resources, for separately compensating each impairment, since each impairment should be learned and analyzed and requires software and hardware testing. In addition, since such transmitters are implemented as integrated circuits (chips), compensation resources also occupy area in the chip.

MZM manipulates light through the Electro-Optic effect. When a differential phase delay between the two parallel MZM arms a and b is applied, the signal is modulated due to constructive and destructive effects after recombining the two arms. A typical structure of an MZM based complex optical modulator is illustrated in FIG. 1. FIG. shows an MZM based I/Q optical modulator structure with a graphical representation of its main impairments. The single MZM field split ratio $G_a$, $G_b$ gain imbalance and phase imbalance $\varphi$. The dual MZM gain imbalance $G_I$, $G_Q$ and phase imbalance $\varphi_{IQ}$, and the MZM nonlinearity.

The electrical field transfer function $y_{MZM}(t)$ of the MZM is described as:

$$y_{MZM}(t) = \frac{E_{outMZM}(t)}{E_{inMZM}(t)} = \frac{1}{2}\left(G_a e^{-j\frac{\pi V_a(t)}{2V_\pi}} + G_b e^{-j\frac{\pi V_b(t)}{2V_\pi}}\right) = \quad \text{[Eq. 1]}$$

-continued $$\underbrace{\frac{1}{2}\left(G_a e^{-j\frac{\pi}{2V_\pi}\left(\frac{V_a(t)+V_b(t)}{2}\right)} + G_b e^{-j\frac{\pi}{2V_\pi}\left(\frac{V_a(t)+V_b(t)}{2}\right)}\right)}_{Modulating\_Data} \cdot$$

$$\underbrace{e^{-j\frac{\pi}{2V_\pi}\left(\frac{V_a(t)-V_b(t)}{2}\right)}}_{Chirp}$$

where $E_{outMZM}$, $E_{inMZM}$ are the Output/Input MZM electrical fields, $V_a$ and $V_b$ are the voltages applied to the a and b arms. $V_\pi$ is the half wave switching voltage (in which phase of the power transfer function changes in $\pi$ and the phase of the voltage transfer function in $\Pi/2$), and $G_a$ and $G_b$ are the arms voltage split gains (defined so that an even voltage split is achieved when both gains are unity). The nonlinearity and complex exponential distortion (often referred to as "chirp" effect) appears as a time varying exponential that further modulates the electrical field.

It is assumed that both the MZM driver bandwidth and the Digital to Analog Converter (DAC) bandwidth (BW) are higher than the modulating signal BW, so the memory effects of the driver on the MZM output can be ignored. On the other hand, when the DAC and/or the driver analog BWs are narrower, it would require setting each imbalanced Digital Pre-Distortion (iDPD) value to be based on previous data values (iDPD with memory).

When the MZM is operating in the range of [$V_\Pi$ $5V_\Pi$], which will be referred to as the operating input region, and the voltage is evenly split between the MZM arms (i.e., $G_b \approx G_a$), the gain value can be defined as $G_{MZM}$. Then, a more common term, which describes the nonlinearity and complex exponential distortion ("chirp") can be rewritten as:

$$y_{MZM}(t) = G_{MZM} \cdot \underbrace{\sin\left(\frac{\pi}{2V_\pi}\left(\frac{V_a(t)+V_b(t)}{2}\right)\right)}_{Nonlinearity} \underbrace{e^{-j\frac{\pi}{2V_\pi}\left(\frac{V_a(t)-V_b(t)}{2}\right)}}_{exponent\_distortion} \quad \text{[Eq. 2]}$$

The voltages $V_a$ and $V_b$ are applied with an offset of $3V_\Pi$ so that voltages are targeted to be within the operation input region. Eq. 2 is directly driven from Eq. 1 (via trigonometric identities), given the assumption on the gain equivalence.

The transfer function of Eq. 2 is the typical MZM representation which includes the sinusoidal nonlinearity and the complex exponent distortion parameter.

MZM Nonlinearity

When the two arms of the MZM are modulated with the same voltage (this configuration is often referred to as 'push-pull') i.e. $V_a = V_b = V_{in}$, the transfer function in Eq. 2 can be written as:

$$y_{MZM}(t) = G_{MZM} \cdot \sin\left(\frac{\pi V_{in}(t)}{2V_\pi}\right) \quad \text{[Eq. 3]}$$

This "push-pull" configuration is widely applied when working with MZM's. Working in this "push-pull" configuration leads to a dominating sinusoidal nonlinear transfer function. The input voltage $V_{in}(t)$ in the operating input range is centered (biased) around $3V_\Pi$ such that the normalized voltage $V(t)$ is $V(t)=V_{in}(t)-3V_\Pi$.

The normalized voltage can be referenced to $V_\Pi$, thereby providing a simple relative measure, which will allow better understanding of the voltage applied to the MZM. This ratio (in dB) can be defined as:

$$(V/V_\pi)_{dB} = 20 \cdot \text{Log}_{10}\left(\frac{\sqrt{\frac{1}{T}\int_{t=0}^{T}V(t)V^*(t)dt}}{V_\pi}\right), \quad [\text{Eq. 4}]$$

where T is the reference transmitted duration, typically defined as several symbols or a full burst, and $V^*(t)$ is the complex conjugate of $V(t)$. This approach for representing transmitter nonlinearity distortion is similar to the method used in RF power amplifiers and in optical pre-distortion methods.

Several prior art methods were proposed to mitigate the MZM nonlinearity. According to one method, the effect of nonlinearity has reduced by applying a dedicated Peak-to-Average Power Ratio (PAPR) reduction technique. Another method combines a Digital Pre-Distortion (DPD) method with dedicated clipping for PAPR reduction. Another method applies a direct inverse function of the nonlinearity, in which the values outside the inverted function are hard-limited.

Single MZM Distortion

When there are differences in voltage split, latency or bias between the two arms, the MZM is referred to as having a single MZM distortion. The difference in voltage split can be defined by the ratio:

$$G_{ab} = \frac{G_a}{G_b} \quad [\text{Eq. 5}]$$

The overall phase difference $\varphi_{ab}$ is a result of the variants in optical path length and the constant bias voltage between the a and b arms. The difference in optical path length $\varphi_{abPath}$ is defined as:

$$\varphi_{abPath} = 2\pi \cdot \frac{(n_b L_b - n_a L_a)}{\lambda}, \quad [\text{Eq. 6}]$$

where $n_a$, $n_b$ are the refraction index of MZM arms, $L_a$, $L_b$ are the optical length of the MZM arms and $\lambda$ is the wavelength of the transmitted optical field.

A constant bias voltage between the MZM arms $V_{ab}$ effectively introduces a phase offset. Thus, the overall phase difference between the arms $\varphi_{ab}$ is given by:

$$\varphi_{ab} = \varphi_{abPath} + \frac{\pi V_{ab}}{2V_\pi} \quad [\text{Eq. 7}]$$

The resulting distorted baseband signal can then be written as:

$$y_{mzmD}(t) = \frac{1}{2}G_{MZM}\left(e^{-j\left(\frac{\pi V_a(t)}{2V_\pi}\right)} + G_{ab} \cdot e^{-j\left(\frac{\pi V_b(t)}{2V_\pi} + \varphi_{ab}\right)}\right) \quad [\text{Eq. 8}]$$

An example of mitigating bias deviation as well as the I-Q imbalance is showed in "Compensation for I/Q Imbalances and Bias Deviation of the Mach-Zehnder Modulators in Direct-Detected Optical OFDM Systems" (W. R. Peng et al, IEEE Photonics Technology Letters, vol. 21, no. 2, pp. 103-105, Jan. 15, 2009), where the impairments are compensated for by applying an equalizer in the receiver based on dedicated pilot signals in the frequency domain.

Dual MZM IQ Imbalance Distortion

In the case of an I-Q modulation schemes, two separate MZM's are being used to create the complex signal. The transfer function $y_{mzmIQ}(t)$ of the complex field can be written as:

$$y_{mzmIQ}(t) = y_{mzmID}(t) + j \cdot y_{mzmQD}(t) \quad [\text{Eq. 9}]$$

where $y_{mzmID}(t)$ and $y_{mzmQD}(t)$ are the distorted in-phase and quadrature transfer functions described earlier in Eq. 8 for a distorted single MZM. The resulting distorted transfer function $y_{mzmIQD}(t)$ can be defined as:

$$y_{mzmIQD}(t) = y_{mzmID}(t) + j \cdot G_{IQ} \cdot e^{-j\varphi_{IQ}} \cdot y_{mzmQD}(t), \quad [\text{Eq. 10}]$$

where $G_{IQ}$ is defined as the ratio between IQ voltage split and $\varphi_{IQ}$ is the relative phase difference between the arms calculated in a similar manner to Eq. 10.

Several methods were suggested to mitigate the effect of I-Q imbalance. One method uses a technique which compensates for the MZM nonlinearity and I-Q imbalance by applying an iterative gradient projection algorithm. Another method uses an equalizer on the receiver side was suggested to mitigate the joint effect of the MZM I-Q imbalance and the fiber channel. Another method treats the transmitter I-Q mismatch by forcing a dedicated pilot structure on the transmitted signal and using them for estimating the imbalance.

The main limitations of the impairment compensation methods are that none of them propose a closed form compensation of all of the impairments, and that the extension of the optimization methods applied, in a way which would cover additional types of impairments, will significantly complicate the optimization. Some methods propose inverse of the nonlinearity. However, these methods do not propose any optimization method in case that the accurate parameters of the impairments are not known in advance.

Another method proposes a generalized memory polynomial structure and a generalized least square approach optimization method for the compensation of the MZM nonlinearity and driver limited BW. Extending this method to include I-Q imbalance or single MZM imbalance, would require the doubling of the memory polynomial to have a separate compensation per I and Q or a pre-compensation of I-Q imbalance prior to applying the memory polynomial. Either way, the system complexity and size would significantly increase.

Another approach to reduce distortions is to provide the same voltage to each arm of the MZM. However, this approach is also insufficient, due to distortions in the voltage that is derived from differences in physical length of the voltage conductors.

It is an object of the invention to provide a method for reducing the effects of MZM impairments and improve the overall performance of an optical communication channel, to allow higher rate fiber optics communication.

Other objects and advantages of this invention will become apparent as the description proceeds.

SUMMARY OF THE INVENTION

A method for compensating the distortions introduced by impairments of MZMz implementing an optical transmitter, comprising the following steps:
a) measuring the level of total amplitude and phase distortions caused by the optical transmitter;

b) optimizing all impairments in the constellation domain by pre-distorting the input signal to be transmitted by symmetrically adding imbalance to the voltage applied to the MZM arms;

the imbalance is determined by:

c) introducing a phase rotation in either I or in the Q path of the optical transmitter, which compensates the total amplitude distortion; and d) introducing a phase rotation to both I and Q paths of the optical transmitter, which compensate the total phase distortion and the phase shift caused by compensating the amplitude distortion, until reaching a desired operating point, which corresponds to the level of pre-distortion.

The geometric distance between distorted locations and the target constellation points, being the desired points in the signal space, at which all distortions are compensated, may be represented by an Error Vector Magnitude (EVM).

In one aspect, pre-distortion may be determined by the number of bits N of digital to analog converter providing voltage to the MZM and the MZM output Error Vector Magnitude (EVM) is bounded by 10-6N [dB].

Impairments may include one or more of the following:
nonlinearity;
single MZM gain imbalance;
single MZM phase imbalance;
dual MZM gain imbalance dual MZM phase imbalance;
any frequency independent impairment.

Optimization may be conducted using means of mean square criterion.

In one aspect, pre-distortion is performed by generating a distorted transfer function consisting of a common $y_{mzmCom}(t)$ signal, and an imbalanced signal $y_{mzmIm}(t)$ which are defined as $$y_{MZM}(t) = \underbrace{G_{MZM} \cdot \sin\left[\frac{\pi}{2V_\pi} \cdot V(t)\right]}_{Y_{mzmCom}(t)} \cdot \underbrace{e^{-j\left[\frac{\pi}{2V_\pi} \cdot \Delta(t)\right]}}_{Y_{mzmIm}(t)}$$

In one aspect, pre-distortion of each MZM is performed by generating a distorted transfer function consisting of a common $y_{mzmCom}(t)$ signal, and an imbalanced signal $y_{mzmIm}(t)$ and defined as $$y_{mzmD}(t) = G_{MZM} \underbrace{\frac{1}{2}\left[e^{-j\left[\frac{\pi V(t)}{2V_\pi}\right]} + G_{ab} \cdot e^{-j\left[\frac{\pi V(t)}{2V_\pi}+\varphi_{ab}\right]}\right]}_{Y_{mzmDcom}(t)} \cdot \underbrace{e^{-j\left[\frac{\pi}{2V_\pi}\right]}}_{Y_{mzmDim}(t)}$$

Pre-distortion of in-phase and quadrature MZM may be performed by generating a distorted transfer function consisting of a common $y_{mzmIDcom}(t)/y_{mzmQDcom}(t)$ and imbalance $y_{mzmIDim}(t)/y_{mzmQDim}(t)$ components and defined by:

$$y_{mzmIQD}(t) = \underbrace{y_{mzmIDcom}(t) \cdot e^{-j\left[\frac{\pi}{2V_\pi}\Delta_I(t)\right]}}_{Y_{mzmIDim}(t)} + j \cdot G_{IQ} \cdot e^{j\varphi_{IQ}} \cdot \underbrace{y_{mzmQDcom}(t) \cdot e^{-j\left[\frac{\pi}{2V_\pi}\Delta_Q(t)\right]}}_{Y_{mzmQDim}(t)}$$

wherein each component results in a constellation rotation around a point on one of the axes.

The imbalance may be added symmetrically to the transmitted symbol.

In one aspect, the method further comprises the step of generating a metric of performance in the form of an Error Vector Magnitude (EVM), being the geometric distance between distorted locations and the target constellation points in the signal space and defined by:

$$EVM = 10 \cdot \text{Log}_{10}\left(\frac{E(y_{mzmIQD}(n) - k_{MZM} V_{IQ}(n))^2}{E((k_{MZM} V_{IQ}(n))^2)}\right),$$

A push-pull configuration may be assumed when $\Delta_I = \Delta_Q = 0$, the push-pull configuration is optimal when there are no distortions.

The optimal EVM value is achieved with non-zero imbalance.

In one aspect, a complex imbalance is used for moving the signal from the distorted constellation point $\{I0, Q0\}$ to the target constellation point $\{Ic, Qc\}$ by:

a) applying either a Q-imbalance being a distortion applied in Q MZM only value or I-imbalance being a distortion applied in I MZM only value and rotating from the distorted constellation point $\{I0, Q0\}$ to a new point $\{I1, Q1\}$, which is on the same power equivalent circle as the target point $\{Ic, Qc\}$;

b) applying a common imbalance on both I and Q rotating the signal from $\{I_I, Q_I\}$ to $\{I_c, Q_c\}$.

DETAILED DESCRIPTION OF THE INVENTION

Figure 1:
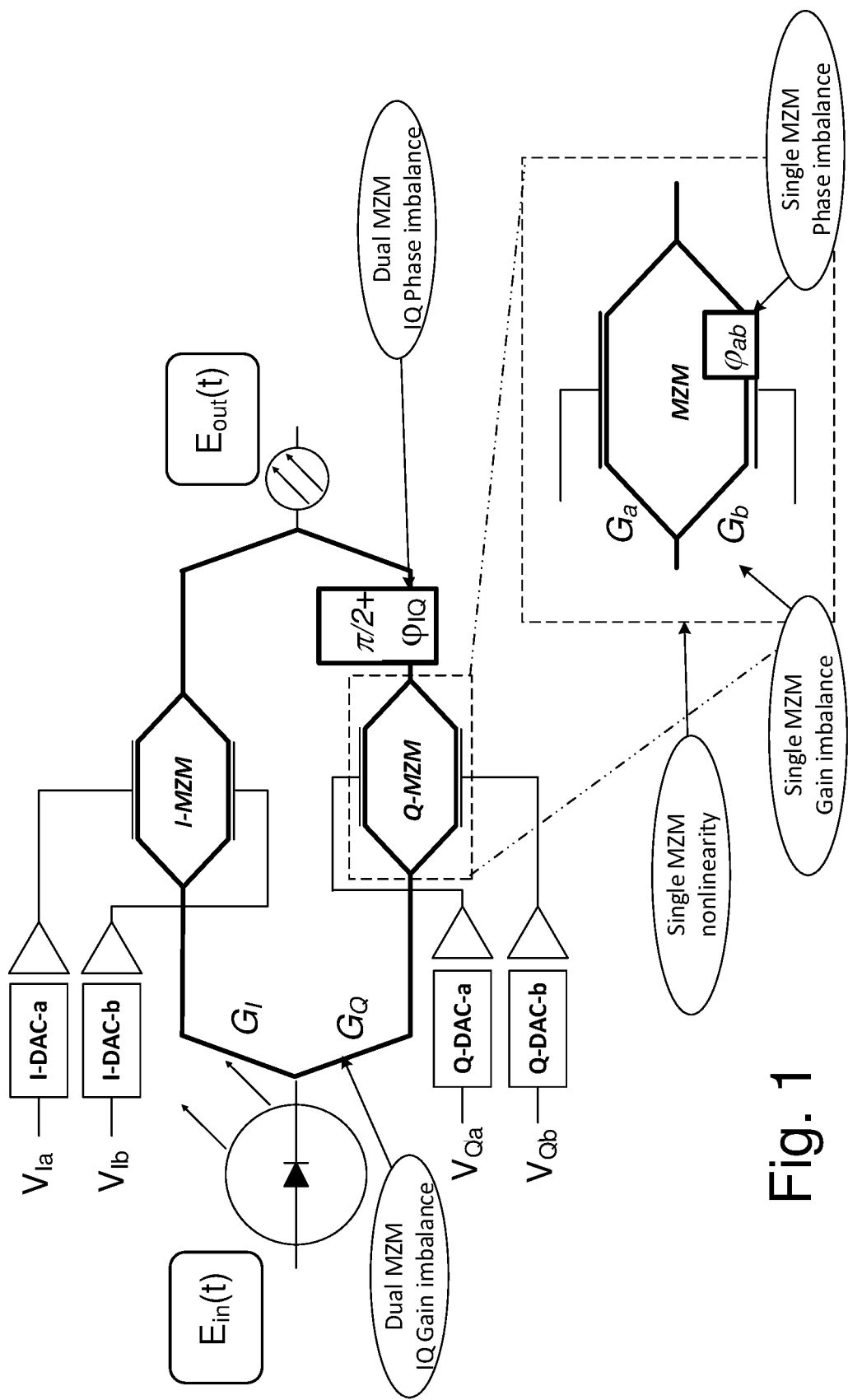
FIG. 1 illustrates an MZM based I/Q optical modulator structure with a graphical representation of its main impairments.

The method proposed by the present invention provides a generalized closed form for the compensation of nonlinearity, single MZM gain and phase imbalance, and dual MZM gain and phase imbalance. All parameters are compensated for both analytically and by applying an optimization method which requires only two optimization parameters, thereby allowing significant simplification of the MZM pre-distortion problem.

iDPD Optimization Targets

The MZM is targeted to be optimized in Optical Signal to Noise Ratio (OSNR) ranges, where it will have minor effect on the performance of next generation high speed coherent optical modulations.

The MZM target noise floor optimization of the iDPD method is set by the limit for its contribution to the overall noise. For example, if the allowed MZM noise contribution is 2 dB, assuming that the MZM noise floor is flat within the signal BW, and the overall OSNR is set to 20 dB, then it means that OSNR from all noise sources except MZM would be 22 dB and the MZM OSNR should be ~2.5 dB better, or 24.5 dB. Similarly if the allowed noise contribution of the MZM is 1 dB, and the target OSNR is 30 dB, then the required MZM OSNR would be ~37 dB. Assuming that the MZM allowed contribution is 1~2 dB of OSNR degradation, the target for its noise floor optimization for very high rate systems would be in the range of 24 dB to 37 dB OSNR.

Forced Symmetric Imbalance

The proposed solution is to find a parameter, which can be used to optimize all impairments in the constellation domain at once, instead of finding and optimizing each impairment separately.

The MZM data voltages applied on each arm $V_a(t)$, $V_b(t)$ presented in Eq. 2 can be rewritten with a common value $V(t)$ and imbalance variable $\Delta(t)$ so that:

$$\begin{cases} V_a(t) = V(t) + \Delta(t) \\ V_b(t) = V(t) - \Delta(t) \end{cases} \quad [\text{Eq. 11}]$$

The distorted transfer function, as described in Eq. 2, can be split to two components: the common $y_{mzmCom}(t)$ signal, and imbalanced signal $y_{mzmIm}(t)$ which are defined as:

$$y_{MZM}(t) = G_{MZM} \cdot \underbrace{\sin\left(\frac{\pi}{2V_\pi} \cdot V(t)\right)}_{Y_{mzmCom}(t)} \cdot \underbrace{e^{-j\left[\frac{\pi}{2V_\pi} \cdots \Delta(t)\right]}}_{Y_{mzmIm}(t)} \quad [\text{Eq. 12}]$$

In a similar manner, the separation to common and imbalanced signal can be applied on the generalized MZM definition from Eq. 8 above:

$$y_{mzmD}(t) = G_{MZM} \underbrace{\frac{1}{2}\left[e^{-j\left[\frac{\pi V(t)}{2V_\pi}\right]} + G_{ab} \cdot e^{-j\left[\frac{\pi V(t)}{2V_\pi}+\varphi_{ab}\right]}\right]}_{Y_{mzmDcom}(t)} \cdot \underbrace{e^{-j\left[\frac{\pi}{2V_\pi}\cdot\Delta(t)\right]}}_{Y_{mzmDim}(t)} \quad [\text{Eq. 13}]$$

The same decomposition can also be applied to in-phase and quadrature MZM, yielding the common $y_{mzmIDcom}(t)$/$y_{mzmQDcom}(t)$ and imbalance signal $y_{mzmIDim}(t)$/$y_{mzmQDim}(t)$ signals. The generalized distorted transfer function from Eq. 10 can be rewritten as an extension of Eq. 13:

$$y_{mzmIQD}(t) = y_{mzmIDcom}(t) \cdot \underbrace{e^{-j\left[\frac{\pi}{2V_\pi}\cdot\Delta_I(t)\right]}}_{Y_{mzmIDim}(t)} + \quad [\text{Eq. 14}]$$

$$j \cdot G_{IQ} \cdot e^{j\varphi_{IQ}} \cdot y_{mzmQDcom}(t) \cdot \underbrace{e^{-j\left[\frac{\pi}{2V_\pi}\cdot\Delta_Q(t)\right]}}_{Y_{mzmQDim}(t)}$$

Figure 2:
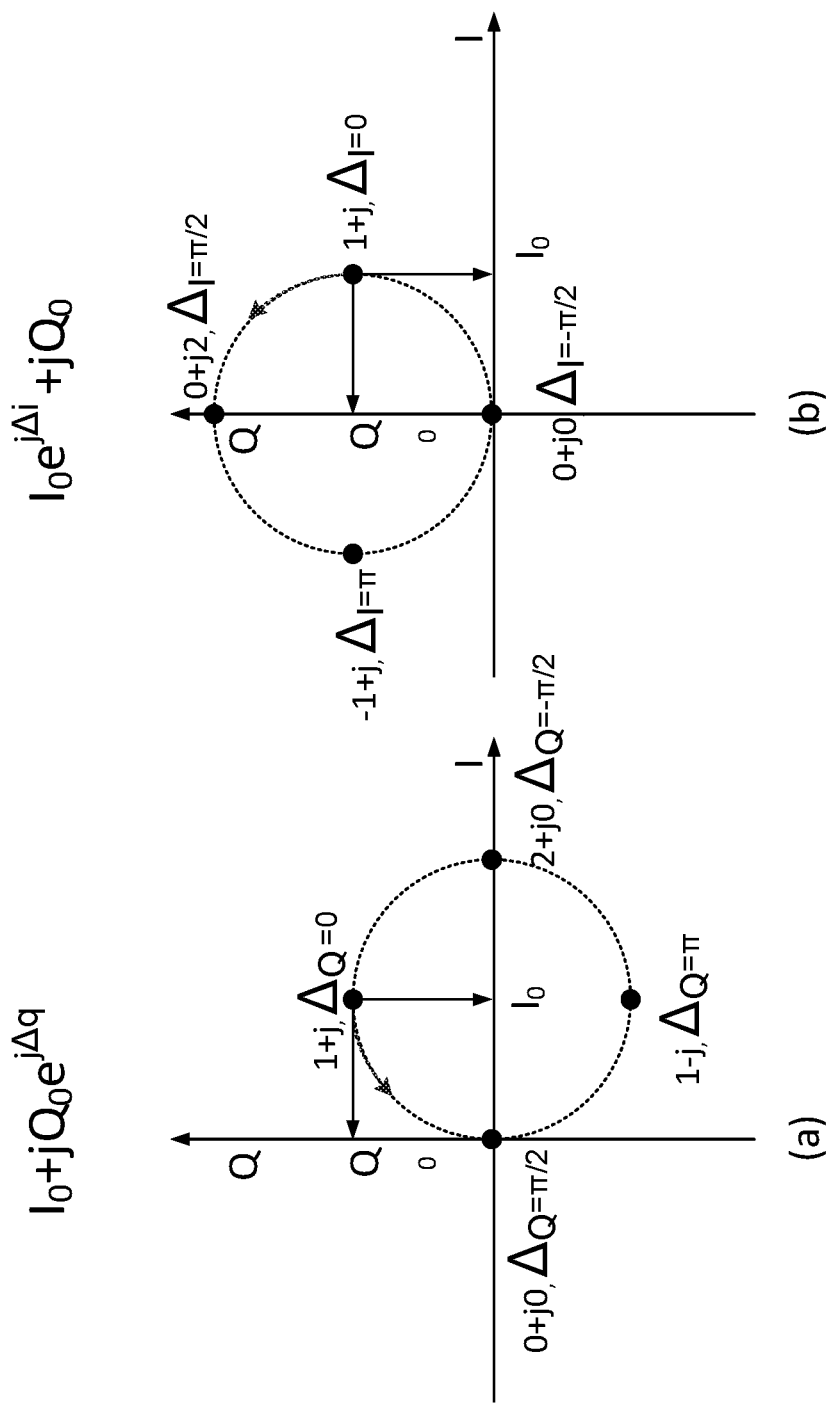
FIG. 2 illustrates the effect of a complex rotation which is a result of an added complex exponent, when: (a) $\Delta_Q$ added to the Q-MZM (b) $\Delta_I$ added to the I-MZM.

Each one of the two components results in a constellation rotation around a point on one of the axes. For example, when applying an imbalance $\Delta_Q(t)$ on the quadrature MZM, the constellation $(I_0, Q_0)$ rotates around the point $(I_0, 0)$ on the constellation plane. Equivalently, an imbalance $\Delta_I(t)$ applied to the in-phase MZM only, results in a rotation around the point $(0, Q_0)$, as shown in FIG. 2.

If the imbalance is added symmetrically to the transmitted symbol, it can be considered as a method for performing linear mapping in the constellation domain. When the distortion of the signal is known, this reverse operation to the linear mapping can be used to move constellation points from a distorted position to its target one, resulting in a pre-distortion operation, based on the forced imbalance, referred to as iDPD.

Error Vector Magnitude (EVM) as a Function of Complex Imbalance Plane

In the case of I-Q modulation, the complex modulating data stream can be defined by:

$$V_{IQ}(n) = V_I(n) + j \cdot V_Q(n) \quad [\text{Eq. 15}]$$

where $V_{IQ}$ is normalized to an RMS value of unity. A common measure of MZM distortion can be achieved by calculating the average Mean Square Error (MSE) between the "practical" complex MZM output, as defined in Eq. 14, and the "ideal" complex modulating data stream (Eq. 15). In the constellation symbol space, this metric is referred to the Error Vector Magnitude (EVM), and defined as follows:

$$EVM = 10 \cdot \text{Log}_{10}\left(\frac{E(y_{mzmIQD}(n) - k_{MZM} V_{IQ}(n))^2}{E((k_{MZM} V_{IQ}(n))^2)}\right) \quad [\text{Eq. 16}]$$

The $k_{MZM}$ value is required in order to normalize constellation voltage ($V_{IQ}$) to the MZM input voltage as defined in Eq. 3 above:

$$k_{MZM} = \frac{\pi}{2V_\pi} \quad [\text{Eq. 17}]$$

Using EVM allows having a joint measure of all impairments, thus gives a unified metric of quality to the MZM. The EVM function can also be used as the target function for optimizing $\{\Delta_I, \Delta_Q\}$.

In typical systems, the minimum EVM is assumed when $\Delta_I = \Delta_Q = 0$ (push-pull configuration). However, this is not true in the general case. In order to demonstrate this, the pair $\{\Delta_I, \Delta_Q\}$ for minimum EVM value is analytically calculated in the case of a non-ideal MZM distorted by I-Q phase imbalance, and is shown to be different than the push-pull configuration.

Considering the MZM transfer function as described above in Eq. 14 with $G_{ab}=1$, $G_{IQ}=1$ and $\varphi_{ab}=0$, with only a phase I-Q imbalance $\varphi_{IQ} \neq 0$ when the average transmitted power is normalized to 1 and the MZM gain is normalized so that $G_{MZM}=1$. The maximum EVM is assumed to be achieved when its derivative in respect to $\{\Delta_I, \Delta_Q\}$ is equal to zero. The MSE of the transmitted constellation is defined as ($V_I$, $V_Q$, $\Delta_I$, $\Delta_Q$ are all a function of the discrete time n):

$$MSE = 10^{EVM/10} = E(\sin(K_{MZM} \cdot V_I)e^{jK_{MZM} \cdot \Delta_I} + j \cdot \sin(K_{MZM} \cdot V_Q)e^{jK_{MZM} \cdot \Delta_Q}e^{j\varphi_{IQ}} - K_{MZM} \cdot V_{IQ})^2 \quad [\text{Eq. 18}]$$

When the ratio $V(t)/V_\pi$ is low, the nonlinearity effect can be assumed as negligible and the function can be approximated by:

$$MSE \approx k_{MZM} E \left\{ \begin{array}{l} ((V_Q\varphi_{IQ})^2 + 2V_Q\varphi_{IQ}V_Q\Delta_Q + (V_Q\Delta_Q)^2) - \\ ((\Delta_I V_I)^2 - 2\Delta_I V_I V_Q\Delta_Q\varphi_{IQ} + (V_Q\Delta_Q\varphi_{IQ})^2) \end{array} \right\} \quad [\text{Eq. 19}]$$

The derivative of the MSE on $\Delta_I$ direction would be:

$$\frac{\partial MSE}{\partial \Delta_I} = 2k_{MZM}E\{\Delta_I^2 V_Q\Delta_Q\varphi_{IQ} - \Delta_I V_I\} \quad [\text{Eq. 20}]$$

and on $\Delta_Q$ direction:

$$\frac{\partial MSE}{\partial \Delta_Q} = 2k_{MZM}E\{V_Q^2\varphi_{IQ} + V_Q^2\Delta_Q + \Delta_I V_I V_Q\varphi_{IQ} - (V_Q^2\Delta_Q\varphi_{IQ}^2)\} \quad [\text{Eq. 21}]$$

In the case of push-pull $\Delta_I = \Delta_Q \approx 0$:

$$\frac{\partial MSE}{\partial \Delta_I} = 0 \quad [\text{Eq. 22}]$$

$$\frac{\partial MSE}{\partial \Delta_Q} = 2k_{MZM}\varphi_{IQ}E\{V_Q^2(n)\} = k_{MZM}\varphi_{IQ}$$

When there is no phase imbalance, the push-pull is potentially at its maximum as the gradient is zero. However, when there is phase imbalance, the gradient is non-zero, which implies that the push-pull configuration does not lead to a minimum MSE value.

Based on the above derivation, even if there is only I-Q phase imbalance, the push-pull configuration is suboptimal. This means that there is no reason to assume that the push-pull configuration would be optimal if additional impairments are included. Thus, some forced imbalance might potentially improve performance in the presence of impairments.

EVM as a Function of Symmetric Imbalance

In order to better understand how the forced imbalance affects EVM, a plain of the EVM (in dB) represented in the complex imbalance domain can be defined. The X-axis is the imbalance applied to the in-phase component in degrees, and the Y-axis is the imbalance applied to the quadrature component. The use of radians is applied in order to represent the circular nature of the complex exponential corrective imbalance $y_{mzmIDim}(t)$ and $y_{mzmQDim}(t)$, as defined in Eq. 14 above.

Figure 3A:
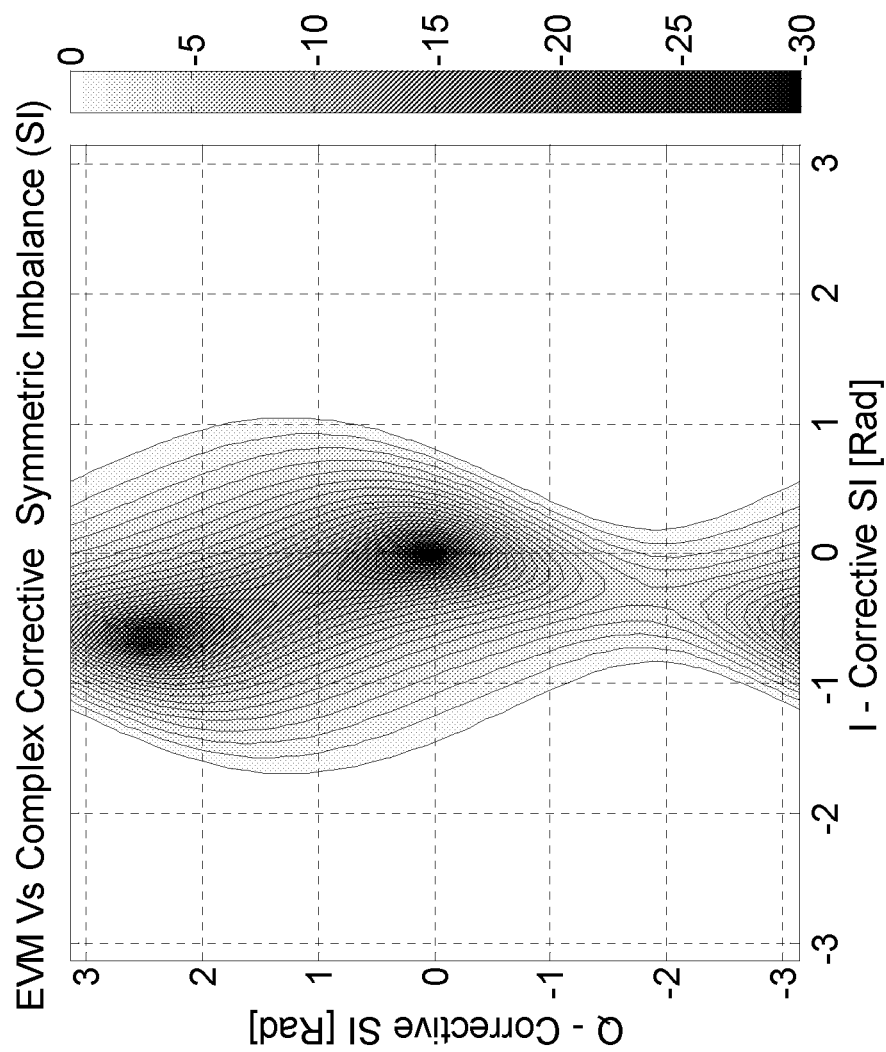
FIGS. 3a and 3b illustrate EVM as function of the complex corrective Symmetric Imbalance (SI) when applying it to a QAM-16 signal with and without impairments.
Figure 3B:
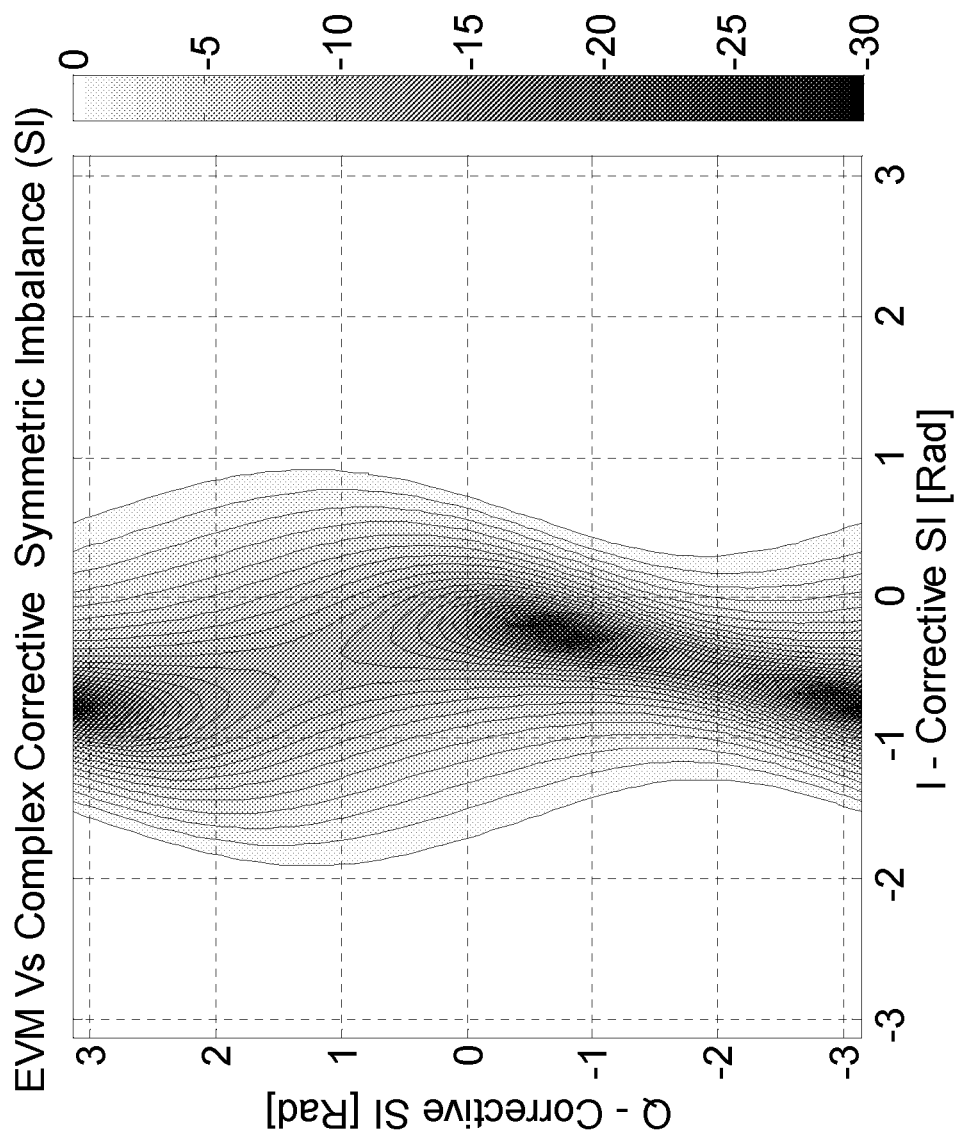

FIG. 3 illustrates an example of contour graphs of EVM for QAM-16 modulation as a function of the complex imbalance in the range of $[-\Pi, \Pi]$. The $[-\Pi, \Pi]$ range represents the entire operating input region around the null point. A 5.5 bit DAC is used with quantization full scale to quantization noise floor of ~38 dB. When operating in a voltage ratio $V(t)/V_\Pi$ (as defined in Eq. 4) of −8 dB, the maximum EVM that can be achieved is −30 dB. It can be noted that for a signal without distortion (FIG. 3a), the push-pull configuration with zero imbalance achieves the optimal EVM. However, there are additional non-zero imbalance values which lead to the same optimal EVM. For example, when the Q-imbalance is set to 2.5 (0.8Π radians) and the I-imbalance is set to ~0.8 (0.25Π radians).

In the case of a distorted MZM, analyzing the EVM versus complex imbalance shows that the best EVM value is achieved with non-zero imbalance. In the example shown in FIG. 3b, a distortion of I-Q imbalance gain ratio of 1.3 and I-Q phase offset of 10° (0.17 rad) is chosen, as it reduces the EVM to be worse than −10 dB, which makes it impractical for QAM-16 transmission. The optimal EVM value of −30 dB is achieved when the I-imbalance is set to 0.25 radians and the Q-imbalance is set to 0.8 radians, while the push-pull configuration achieves an EVM value of ~−10 dB. Based on Eq. 12, the rotation β due to symmetric imbalance would be:

$$\beta = \frac{\pi}{2V_\pi} \cdot \Delta \quad [\text{Eq. 23}]$$

Which means that in order to achieve the optimal I value of β=0.25 rad, the I-imbalance would be $$\Delta_I = \frac{V_\pi}{2\pi} \approx 0.16 \cdot V_\pi.$$

Similarly, the optimal Q value of β=0.8 rad can be achieved by applying a Q-Imbalance of $$\Delta_Q = \frac{1.6 V_\pi}{\pi} \approx 0.5 \cdot V_\pi.$$

The goal of the iDPD concept is to propose a closed form and simple generic iterative method for finding the complex imbalance values which would optimize MZM performance in the EVM sense.

Optimal Pre-distortion Values with known impairments

Normally, each MZM operates in a balanced mode where the same voltage is provided to each of its inputs, i.e., $V_{Ia} = V_{Ib}$ and $V_{Qa} = V_{Qb}$ (see FIG. 1). In order to compensate the impairments, each MZM operates in an imbalanced mode.

In order to determine the level of imbalance, the total distortion of the transmitter is measured (e.g., by transmitting a known test signal and measuring the distorted signal at the output).

The distortion compensation is carried out both in I and Q paths (complex compensation) by first introducing phase rotation in the I path, which compensates the amplitude (gain) distortion. However, compensation of amplitude distortion entails a shift in the phase (in addition to phase distortion), which should be compensated, as well (until reaching the desired operating point). Therefore, at the next step, different phase rotations are concurrently introduced both in I and Q paths, which compensate the total phase distortion. This two-step complex compensation process will be described in detail later on.

It should be understood that this two-step complex compensation process may start by first introducing phase rotation in the Q path, to compensate the amplitude (gain) distortion and then at the next step, required (and different) phase rotations are concurrently introduced both in I and Q paths, which compensate the total phase distortion.

Representation of Pre-Distortion in the Signal Space

The EVM is the geometric distance between distorted locations and the target constellation points in the signal space. The target constellation point is defined as $\{I_c, Q_c\}$ and the distorted constellation point is defined as $\{I_0, Q_0\}$ based on the real and imaginary part of the distorted transfer function defined in (14) above such that:

$$\begin{cases} I_0 = \text{Re}\{y_{mzmIQD}(t)\} \\ Q_0 = \text{Im}\{y_{mzmIQD}(t)\} \end{cases} \quad [\text{Eq. 24}]$$

The iDPD concept uses the complex imbalance defined in Eq. 14 for moving the signal from the distorted constellation point $\{I_0, Q_0\}$ to the target constellation point $\{I_c, Q_c\}$, which is the desired point, at which all distortions are compensated.

This can be achieved in two steps as follows:

Step 1: Apply a Q-imbalance (a distortion applied in Q MZM only) value $\Delta_{step1}$, rotating from the distorted constellation point $\{I_0, Q_0\}$ to a new point $\{I_1, Q_1\}$, which is on the same power equivalent circle as the target point $\{I_c, Q_c\}$. The operation can mathematically be described as:

$$I_0 + jQ_0 e^{j\Delta_{step1}} = I_1 + jQ_1 \quad [\text{Eq. 25}]$$

Step 2: Apply a common imbalance $\Delta_{step2}$ on both I and Q rotating the signal from $\{I_1, Q_1\}$ to $\{I_c, Q_c\}$. The Operation can mathematically be described as:

$$(I_1 + jQ_1) e^{j\Delta_{step2}} = I_c + jQ_c \quad [\text{Eq. 26}]$$

Figure 4:
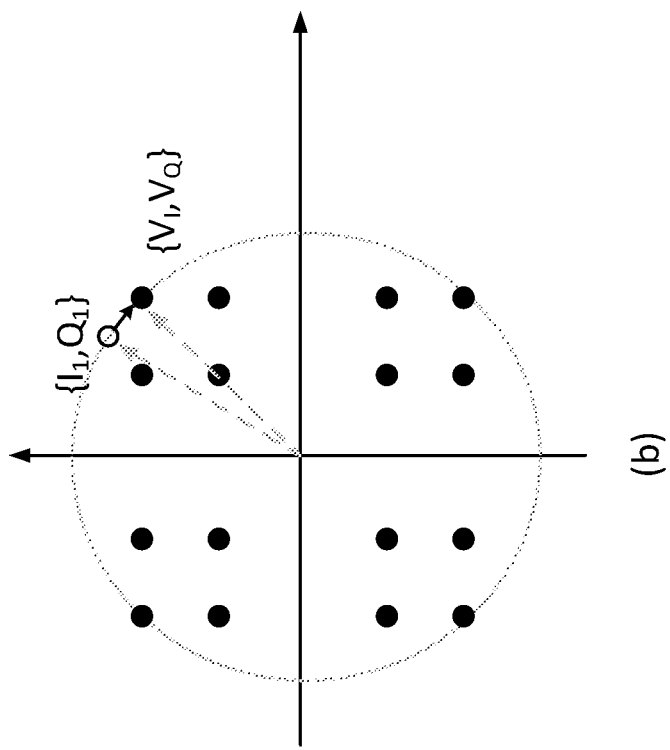
FIGS. 4a and 4b illustrate two step complex imbalance based transform applied to a QAM-16 distorted constellation point.
Figure 4:
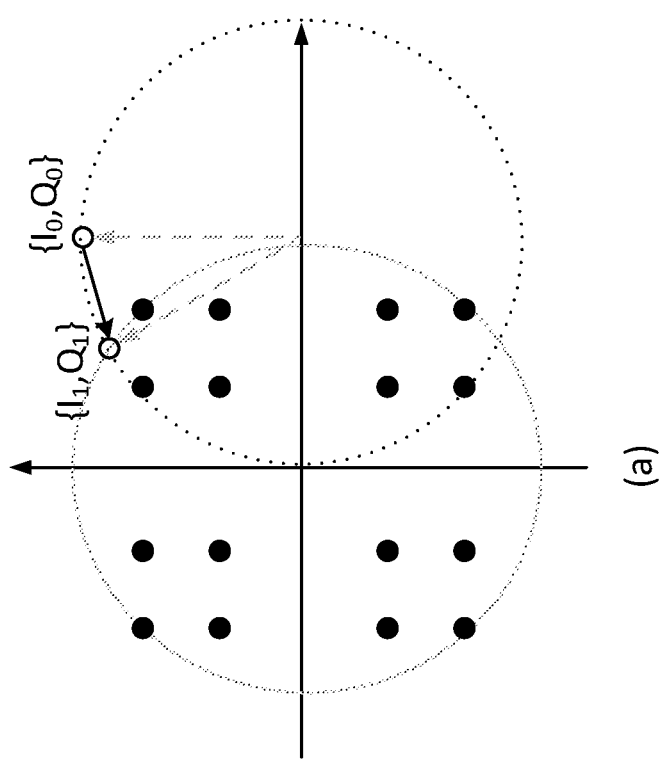

FIG. 4 graphically illustrates the two steps. Following the above two steps, the corrective imbalance factors $\{\Delta_{step1}, \Delta_{step2}\}$ that are required to perform the rotation can be represented as finding the solution to the nonlinear complex equation:

$$I_0 e^{j(\Delta_{step2})} + jQ_0 e^{j(\Delta_{step1} + \Delta_{step2})} = I_c + jQ_c \quad [\text{Eq. 27}]$$

which can be rewritten as two equations for the real and imaginary parts:

$$\begin{cases} I_0 \cdot \cos(\Delta_{step2}) - Q_0 \cdot \sin(\Delta_{step1} + \Delta_{step2}) = I_c \\ I_0 \cdot \sin(\Delta_{step2}) + Q_0 \cdot \cos(\Delta_{step1} + \Delta_{step2}) = Q_c \end{cases} \quad [\text{Eq. 28}]$$

The imbalance applied to the in-phase and quadrature parts can therefore be written as:

$$\begin{cases} \Delta_I = \Delta_{step2} \\ \Delta_Q = \Delta_{step1} + \Delta_{step2} \end{cases} \quad [\text{Eq. 29}]$$

Analytic Derivation of the Pre-Distortion Values

When the distortion parameters are known, the constellation point in the signal space $\{I_0, Q_0\}$ can be calculated using Eq. 10. In turn, $\{\Delta_{step1}, \Delta_{step2}\}$ can be derived from the two equations in Eq. 28. Therefore, the proposed iDPD can fully compensate for the MZM distortions.

The solution of Eq. 28 can be performed by analyzing the rotation of the two independent steps described in the previous section as follows:

Step 1: Find the phase of rotation from the distorted signal $\{I_0, Q_0\}$ set by $\Delta_{step1}$ to the intermediate point $\{I_1, Q_1\}$:

$$\|I_0 + jQ_0 e^{j\Delta_{step1}}\| = \|I_1 + jQ_1\| = \|I_c + jQ_c\|$$

$$(I_0 - Q_0 \cdot \sin(\Delta_{step1}))^2 + (Q_0 \cdot \cos(\Delta_{step1}))^2 = I_c^2 + Q_c^2$$

$$I_0^2 + Q_0^2 - 2I_0 Q_0 \cdot \sin(\Delta_{step1}) = I_c^2 + Q_c^2 \quad [\text{Eq. 30}]$$

If the power of each constellation point is defined as $P = I^2 + Q^2$, then Eq. 30 can be rewritten as:

$$\Delta_{step1} = \arcsin\left(\frac{P_0 - P_c}{2 I_0 Q_0}\right) \quad [\text{Eq. 31}]$$

where $P_0$ is the power of the distorted point $\{I_0, Q_0\}$ and $P_c$ is the power of the target intermediate point $\{I_1, Q_1\}$, which is equal to the power of the target constellation point $\{I_c, Q_c\}$.

Step 2: Find the phase of rotation around the axis from the intermediate point to the target constellation point. The rotation angle can be extracted from the phase difference between $\{I_1, Q_1\}$ and $\{I_c, Q_c\}$, which can be derived by:

$$\Delta_{step2} = \arctan\left(\frac{Q_c}{I_c}\right) - \arctan\left(\frac{Q_1}{I_1}\right) \quad [\text{Eq. 32}]$$

The corrective imbalance values $\{\Delta_{step1}, \Delta_{step2}\}$ from Eq. 31 and Eq. 32 solves the nonlinear equation (Eq. 27) and form a full analytic solution for the pre-distortion values that are required to compensate for the MZM impairments. Thus, following (Eq. 29) the values that should be applied to the I-Q MZM for full compensation, are:

$$\begin{cases} \Delta_I = \arctan\left(\frac{Q_c}{I_c}\right) - \arctan\left(\frac{Q_1}{I_1}\right) \\ \Delta_Q = \arcsin\left(\frac{P_0 - P_{IQ}}{2 I_0 Q_0}\right) + \arctan\left(\frac{Q_c}{I_c}\right) - \arctan\left(\frac{Q_1}{I_1}\right) \end{cases} \quad [\text{Eq. 33}]$$

The complex combination of $\{\Delta_I, \Delta_Q\}$ is defined as the iDPD compensation parameters.

Performance of Quantized Pre-Distortion Values

Quantization of iDPD Parameters

Figure 5:
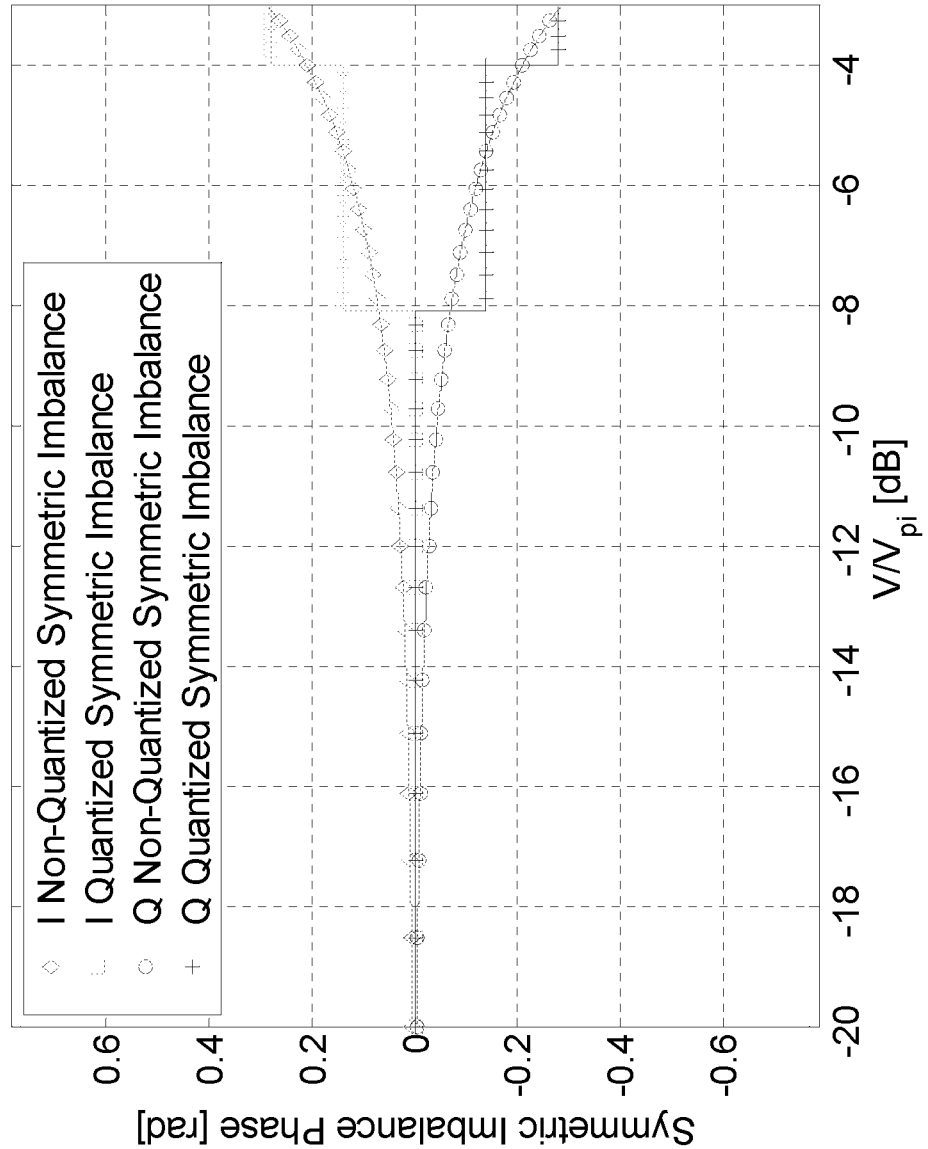
FIG. 5 illustrates optimal and quantized corrective imbalance values Vs $V(t)/V_\pi$ for a MZM dominated by nonlinearity.

In a practical system, the symmetric imbalance values are quantized by the DAC used to apply the voltage on the MZM arms. In FIG. 5, the 5.5 bit DAC quantized iDPD parameters $\{\Delta_I, \Delta_Q\}$ are compared with non-quantized iDPD parameters in a nonlinearity dominated MZM as a function of the relative voltage ratio $V(t)/V_\Pi$ in dB. The phase quantization steps of $2\Pi/45 \approx 0.13_{rad}$ are observed around the $V(t)/V_\Pi$ values of −8 dB and −4 dB, leading to a potential degradation in performance.

Accurate Correction of Quantized Imbalance

When the iDPD parameters are quantized with N bits over the entire correction circle, precise compensation is achieved only when the solutions to the equations at Eq. 33 are integer multiplications of the quantization steps:

$$\begin{cases} \text{Round}\left\{\Delta_I \cdot \frac{2^N}{2\pi}\right\} = \Delta_I \cdot \frac{2^N}{2\pi} = k_I \\ \text{Round}\left\{\Delta_Q \cdot \frac{2^N}{2\pi}\right\} = \Delta_Q \cdot \frac{2^N}{2\pi} = k_Q \end{cases} \quad [\text{Eq. 34}]$$

with N, the effective number of DAC bits and $k_I$, $k_Q$ defined as integer values.

Figure 6:
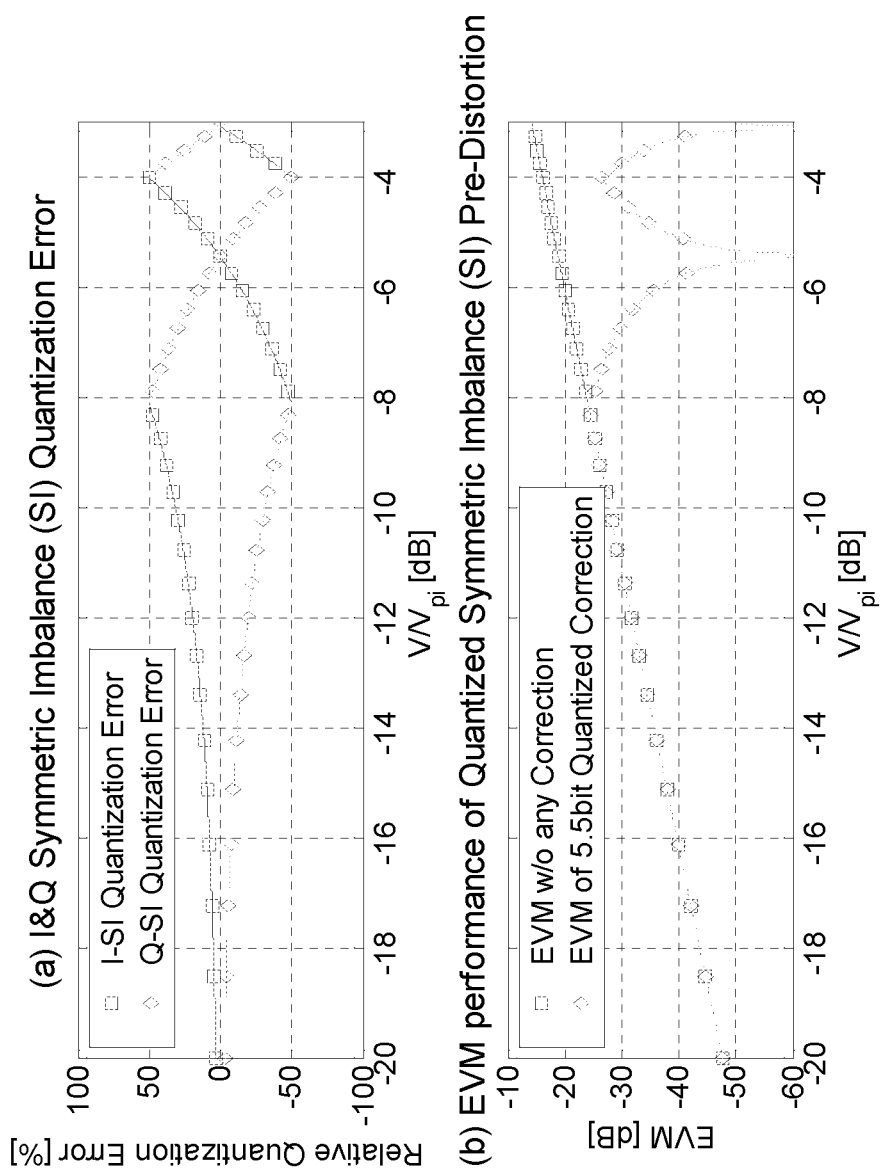
FIG. 6 illustrates EVM performance of a quantized corrective imbalance in a non-linearity dominated system.

FIG. 6a presents the quantization error of the iDPD parameters from FIG. 5 versus the ratio $V(t)/V_\pi$ in dB. FIG. 6b shows the EVM as a function of the ratio $V(t)/V_\pi$ in dB. It can be noticed that a significant improvement of the EVM is achieved when both quantization errors are close to zero. The $V(t)/V_\pi$ values in which the quantized iDPD parameters are optimal, can be found numerically as the minimum value of the multiplication between the quantization error of the iDPD parameters:

$$M_{iDPD} = \operatorname{argmin}$$

$$\left\{ \left| \operatorname{Round}\left\{ \Delta_I \cdot \frac{2^N}{2\pi} \right\} - \Delta_I \cdot \frac{2^N}{2\pi} \right| \cdot \left| \operatorname{Round}\left\{ \Delta_Q \cdot \frac{2^N}{2\pi} \right\} - \Delta_Q \cdot \frac{2^N}{2\pi} \right| \right\}$$

[Eq. 35]

where $\{\Delta_I, \Delta_Q\}$ are a function of $V(t)/V_\pi$. This operation is only done once: when the DAC resolution and MZM input voltage range are defined, thus it does not have significant impact on system complexity.

Limits on Quantized iDPD Performance

The worse case error due to quantized correction is a result of the quantization of the two phases $\{\Delta_I, \Delta_Q\}$ applied on the distorted point $\{I_0, Q_0\}$. Each phase error (as shown above in FIG. 2.) generates an error proportional to the radius of rotation. Thus, assuming that the phase error is small enough, the arc equals its supporting chord, and the maximum signal space error due to the quantized phase would be half the chord length, which can be bounded by:

$$\varepsilon_{Quantized\_\Delta} = \frac{1}{2} \cdot \frac{2\pi \cdot \max\{I_0, Q_0\}}{2^N}$$

[Eq. 36]

When the signal RMS is normalized to unity, the metric of MSE is equivalent to the EVM, thus:

$$\text{EVM} = 10\log_{10}(\pi^2) - 10\log_{10}(2^{2N}) + 20\log_{10}(\max\{I_0, Q_0\}) \approx 10 - 6N + 20\log_{10}(\max\{I_0, Q_0\})$$

[Eq. 37]

Figure 7:
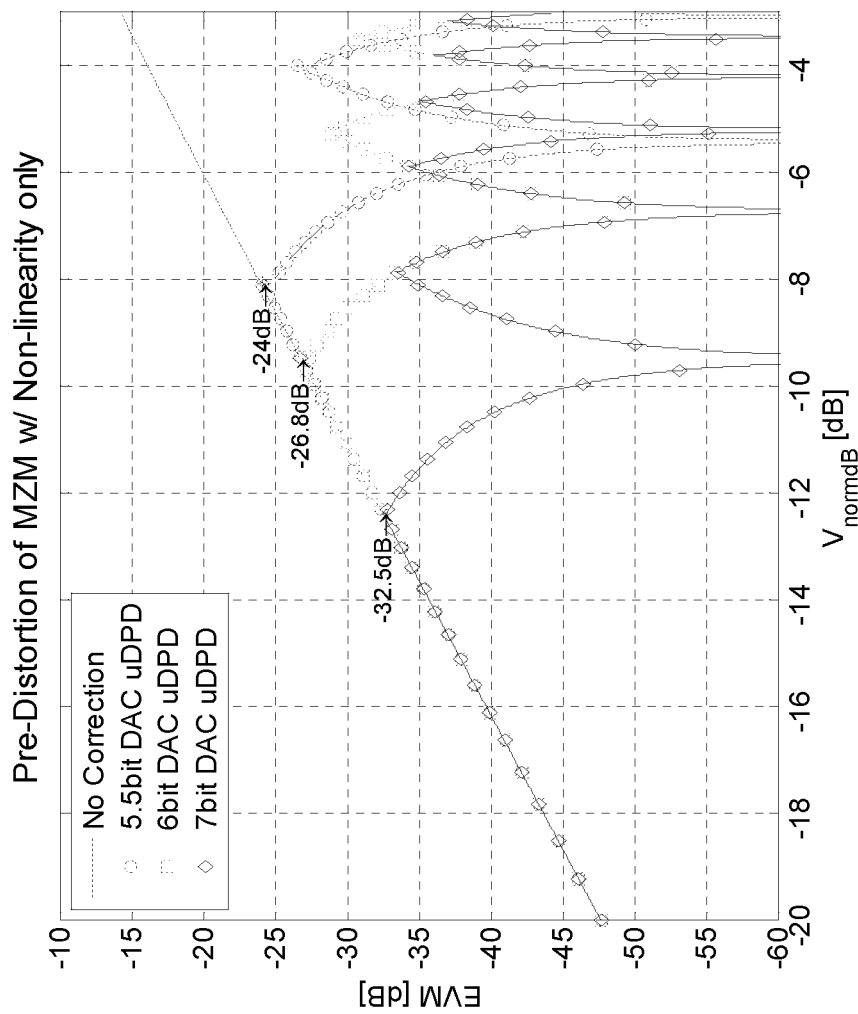
FIG. 7 illustrates the effect of quantization error on pre-distortion performance with 5.5, 6 and 7 bit DAC in a nonlinearity dominated MZM.

FIG. 7 shows a graph of EVM as a function of $V(t)/V_\pi$ for DAC values with 5.5 (which is the typical benchmark), 6 and 7 bits in a nonlinearity dominated MZM. As the initial distorted point $\{I_0, Q_0\}$ has a lower power than the target constellation point (due the sinusoidal non-linearity), the relative EVM correction factor $20\log_{10}(\max\{I_0, Q_0\})$ is always negative which improves the overall EVM as function of the ratio $V(t)/V_\pi$ decreases. This means that the limit on EVM performance can be estimated by:

$$\text{EVM}_{lim} \approx 10 - 6N$$

[Eq. 38]

Quantized Gain and Phase Imbalance Correction

The effect of quantized iDPD has been previously analyzed on a nonlinearity dominated MZM. The analysis showed that there are specific input voltages in which the EVM is minimized. For example when setting the $V(t)/V_\pi$ to −5.5 dB (found numerically) the nonlinearity is almost completely compensated (as shown in FIG. 7) and the $V(t)/V_\pi$ is referred to as optimal. However, even if the system is designed to work in this input voltage, the single MZM and dual MZM gain and phase distortions may significantly affect performance.

Figure 8A:
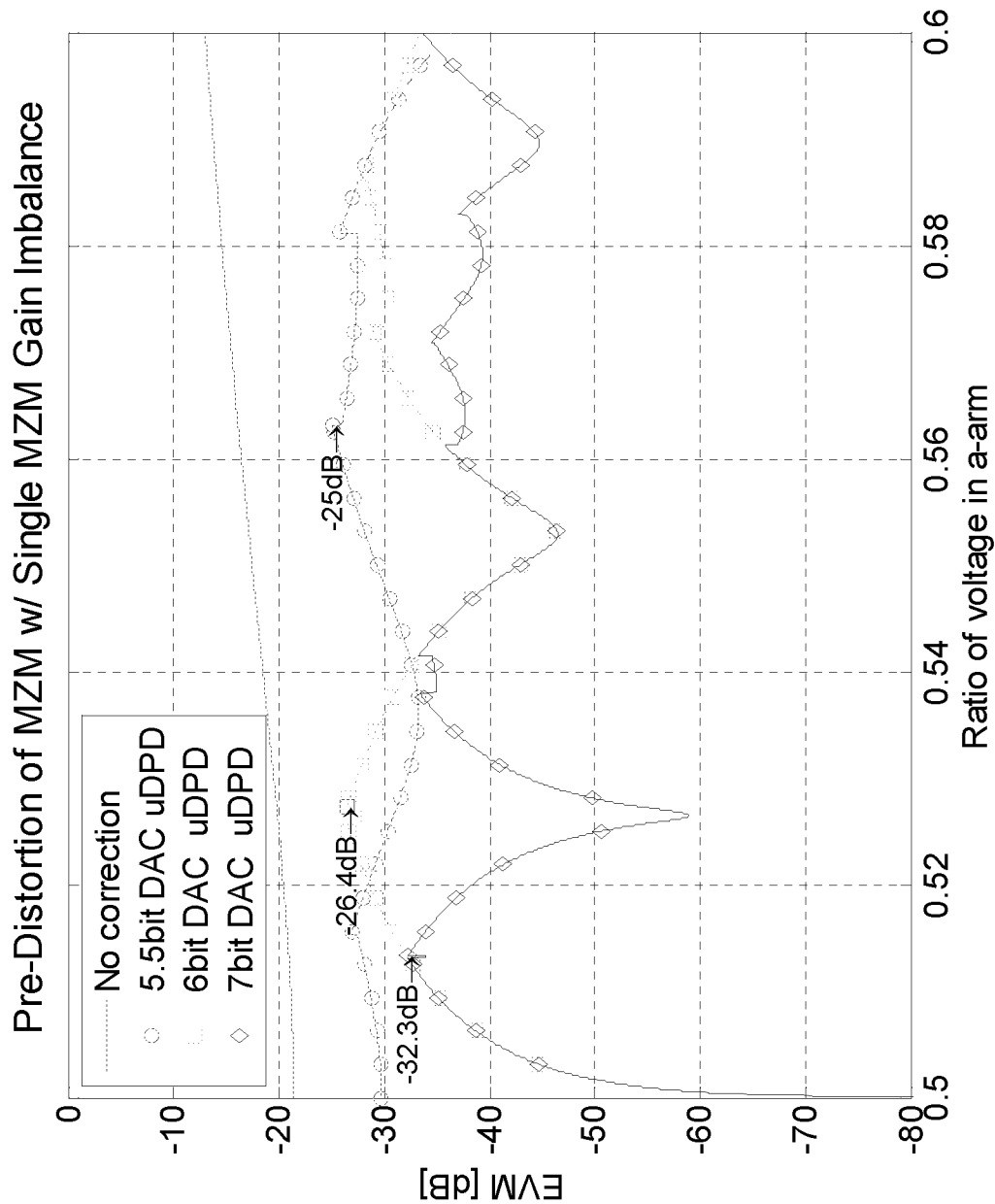
FIGS. 8a and 8b illustrate the effect of quantization error with single MZM gain and phase distortion with 5.5, 6 and 7 bit DAC and $V(t)/V_\pi$ of −5.5 dB.
Figure 8B:
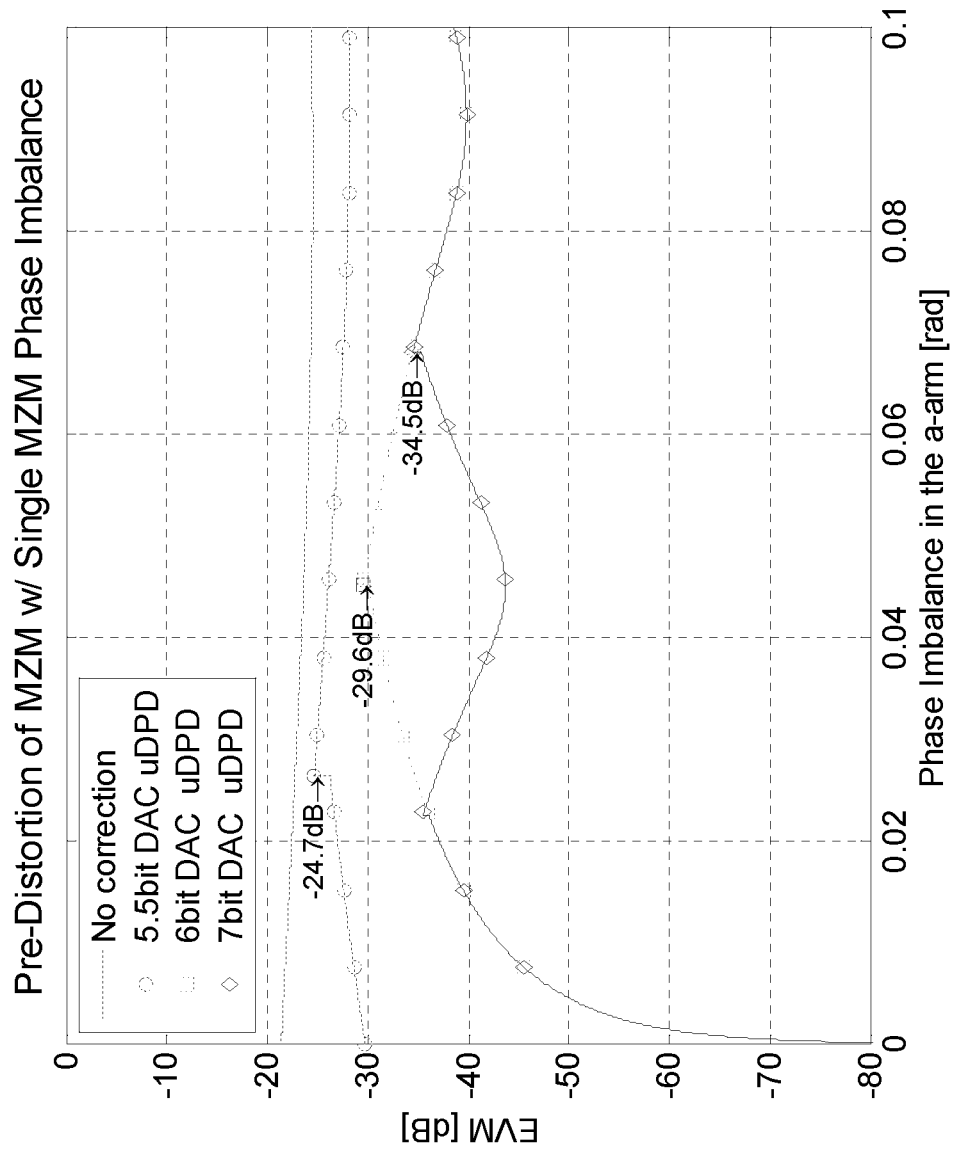

FIG. 8 shows the effect of a single MZM gain and phase imbalance on EVM is shown for the optimal $V(t)/V_\pi$. It can be seen that when there is no gain or phase imbalance, the EVM is ~−80 dB. However as either gain or phase imbalance increases the absolute value of EVM drops fast.

Figure 9A:
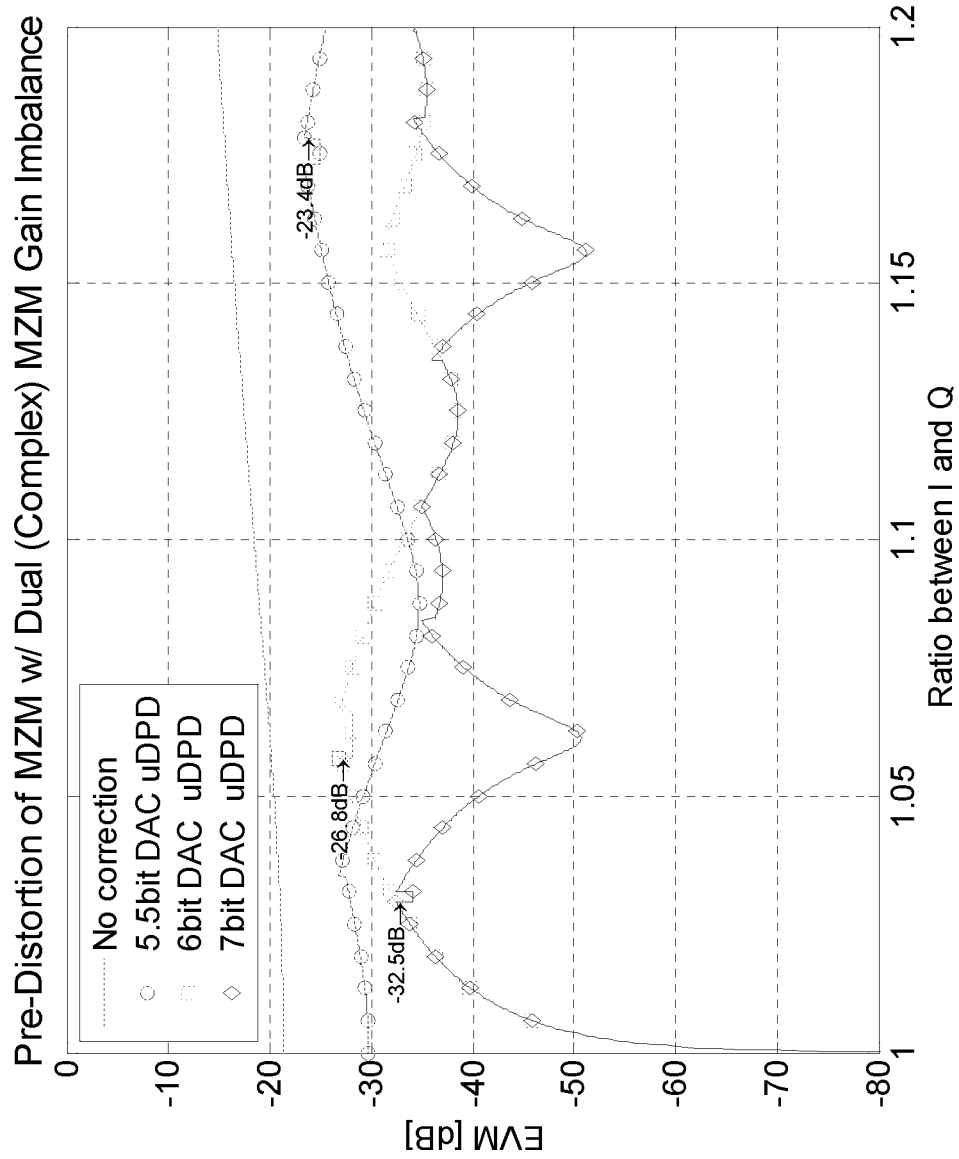
FIGS. 9a and 9b illustrate the effect of quantization error with dual (complex) MZM gain and phase distortion with 5.5, 6 and 7 bit DAC and a voltage ratio $V(t)/V_\pi$ of ~−5.5 dB.
Figure 9B:
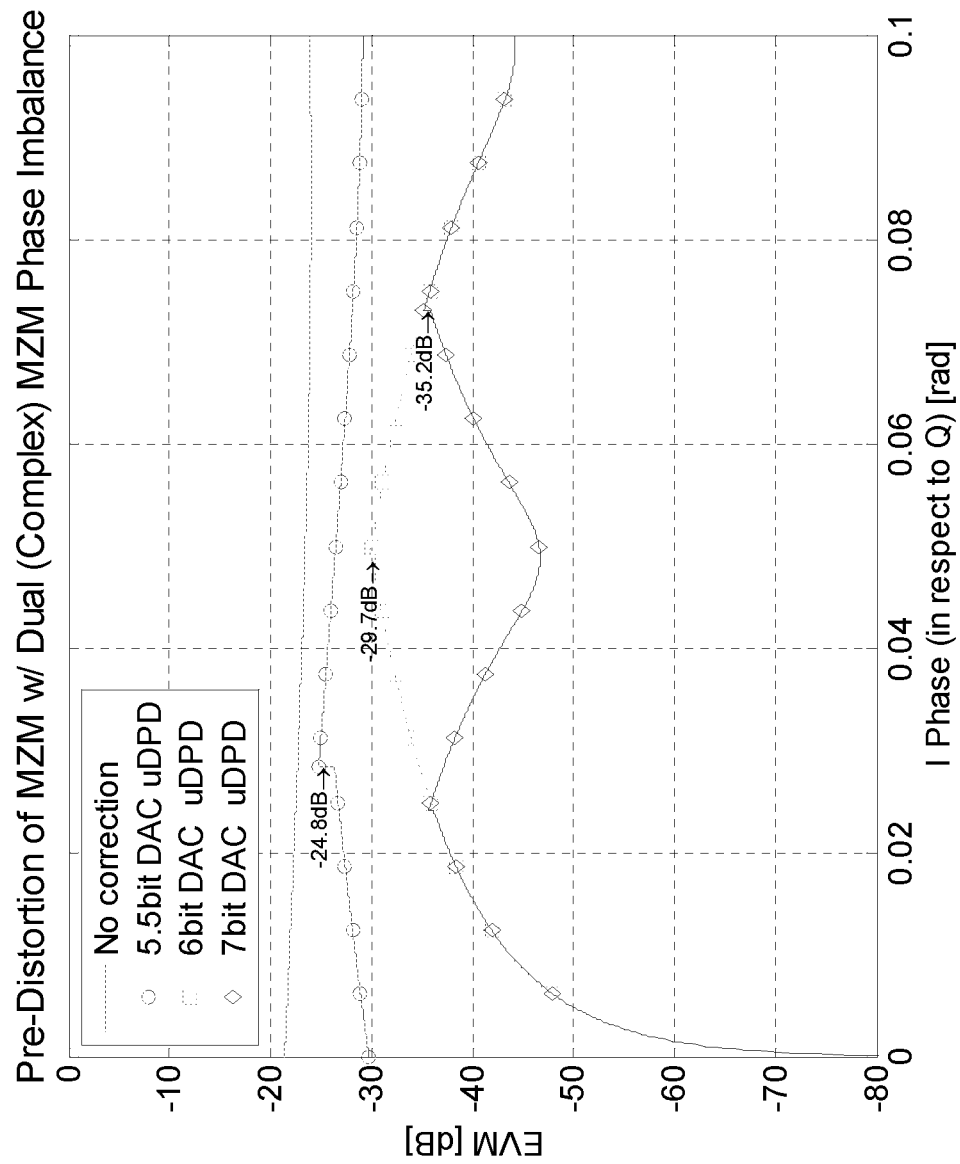

In FIG. 9, the effect of dual (complex) MZM gain and phase imbalance is shown for the optimal $V(t)/V_\pi$. A pattern similar to the single MZM behavior is observed, in which slight changes in gain or phase imbalance causes fast drops in EVM. In both cases, the EVM performances are in good agreement with the quantization limit defined in Eq. 38.

Performance of Compensated QAM-16 MZM Modulation

Figure 10:
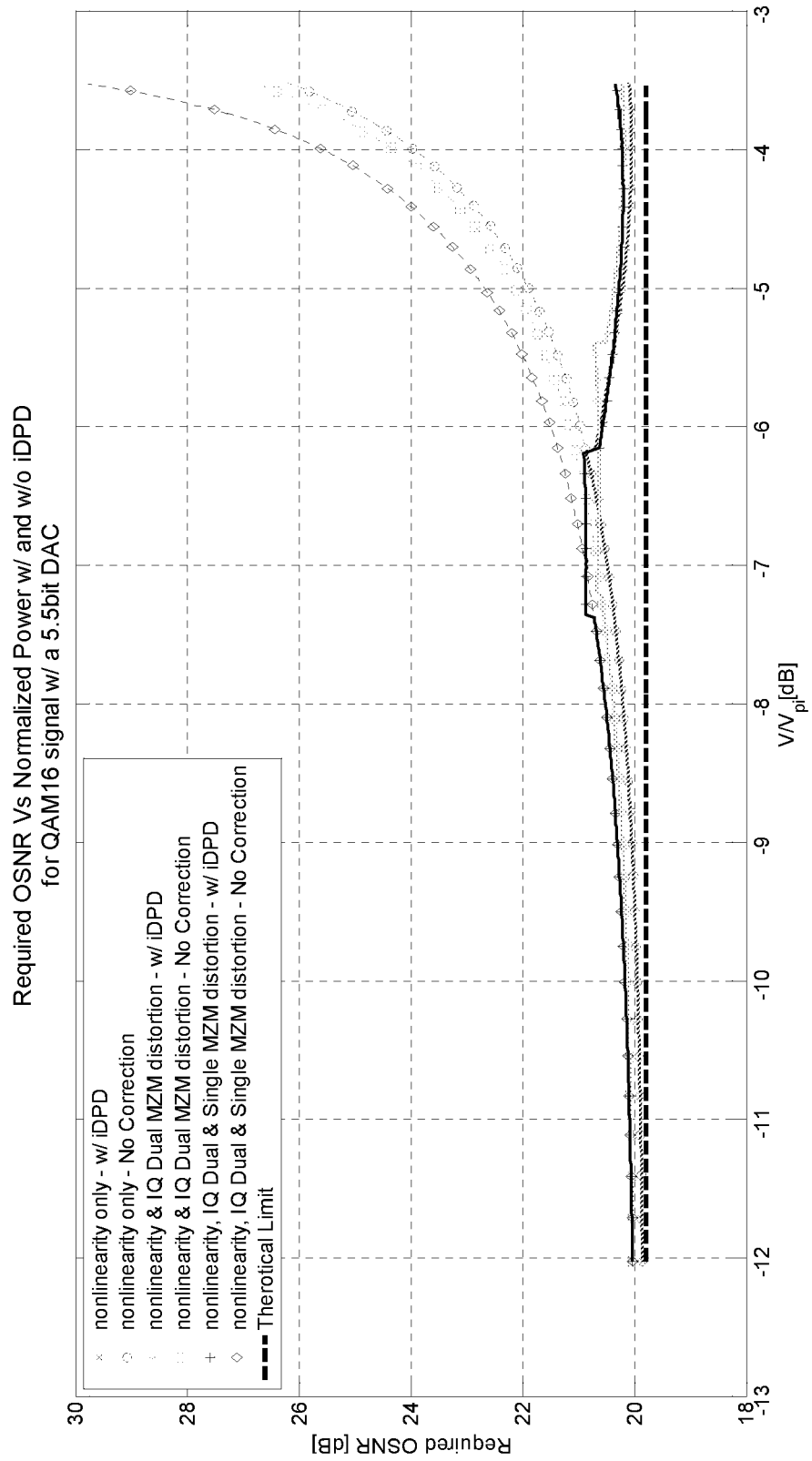
FIG. 10 illustrates the required OSNR Performance of iDPD for a QAM-16 signal in three cases: when a nonlinear only distortion is applied, with nonlinearity combined with ~2% IQ Dual MZM gain imbalance (1.02/0.98 gain split), with nonlinearity combined with 2% IQ dual gain imbalance and 1° of single MZM phase offset.

In order to have a better understanding of the expected MZM performance with the iDPD, an analysis of required OSNR for a PDM-16QAM signal is presented in FIG. 10. The target BER is $2.4 \times 10^{-2}$ and the target OSNR is 19.8 dB. A 5.5 bit ENOB DAC is applied for the iDPD correction.

Three cases are considered: when there is no impairment except nonlinearity, when there is IQ imbalance gain distortion of 2% and when the single MZM phase distortion is 1°.

The analysis shows that applying the iDPD method on QAM-16 signals with a 5.5 bit AC can be used improve the require OSNR by 5~8 dB, depending on the applied voltage and the level of distortion, mainly due to iDPD ability of maintaining almost the same level of noise contribution for applied voltage dynamic range.

Finding iDPD Parameters Through Iterative Search

Iterative Search Problem Definition

When the parameters of the impairments are only partially known, or known with low confidence, analytic solution would yield unknown error. On the other hand, applying a full iterative search in which all potential quantized imbalance values are calculated, is typically non feasible from most practical aspects. The approach proposed by the present invention is to define the following optimization problem based on the EVM definition in Eq. 16 above:

Maximize ABS{EVM} where
EVM=f$\{\Delta_I, \Delta_Q\}$.
f$\{\Delta_I, \Delta_Q\}$ is defined by Eq. 16 above
$\Delta_I = \Delta_{step2}$
$\Delta_Q = \Delta_{step1} + \Delta_{step2}$
Apply the Inequality constraints:
$0 < \Delta_I, \Delta_Q < 2\Pi$ The inequality constraints imply that the dynamic range of the DAC driving signal allows a full rotation of correction parameters.

The EVM can be calculated by adding a loopback to the system from the transmitter to the receiver. The signal at the output of the loopback is coherently demodulated and compared with the transmitted data. Alternatively, the optimization concept can be applied as part of the manufacturing line, in which the compensation scheme for each symbol constellation is calculated separately. However in this approach, potential changes in impairments, due to temperature changes and aging, are difficult to track.

The EVM function may have several minima, which locations are the solutions of the optimization problem. Thus a method for locating and identifying the global minima is required. The trust region optimization is a known method for finding global minima in non-convex functions.

The method is based on finding an initial point which is an approximation of the target function, and it is assumed that within the 'trust region' the function is convex and that the global minima is inside that region around the approximated point. On each iteration the search direction and trust region size are updated, until convergence is achieved.

Initial Conditions for the Trust Region Optimization

Initial conditions can be derived from the analytic solution, however, the use of complex trigonometric functions is typically avoided due to the computational resources required for their calculation. An alternative approach is to use the first order linear approximation of Eq. 28 which is presented as:

$$\begin{cases} I_0 - Q_0(\Delta_{step1} + \Delta_{step2}) = I_c \\ I_0 \Delta_{step2} + Q_0 = Q_c \end{cases} \quad [\text{Eq. 39}]$$

And its solution:

$$\begin{cases} \Delta_{step1} = \dfrac{I_0 - I_c}{Q_0} - \dfrac{Q_c - Q_0}{I_0} \\ \Delta_{step2} = \dfrac{Q_c - Q_0}{I_0} \end{cases} \quad [\text{Eq. 40}]$$

As optimizing the EVM plane is equivalent to optimizing the minimum geometric distance in the symbol space, the values found in Eq. 40 can be used as initial conditions for the trust region method for finding the minimum EVM value in the complex imbalance plane:

$$\begin{cases} \Delta_{I\_init} = \Delta_{step2} = \dfrac{Q_c - Q_0}{I_0} \\ \Delta_{Q\_init} = \Delta_{step1} + \Delta_{step2} = \dfrac{I_0 - I_c}{Q_0} \end{cases} \quad [\text{Eq. 41}]$$

Therefore, finding the optimal pre-distortion values requires setting the initial conditions $\{I_0, Q_0\}$ based on the known MZM distortion parameters and the transmitted data symbol as shown in Eq. 41 above.

Figure 11:
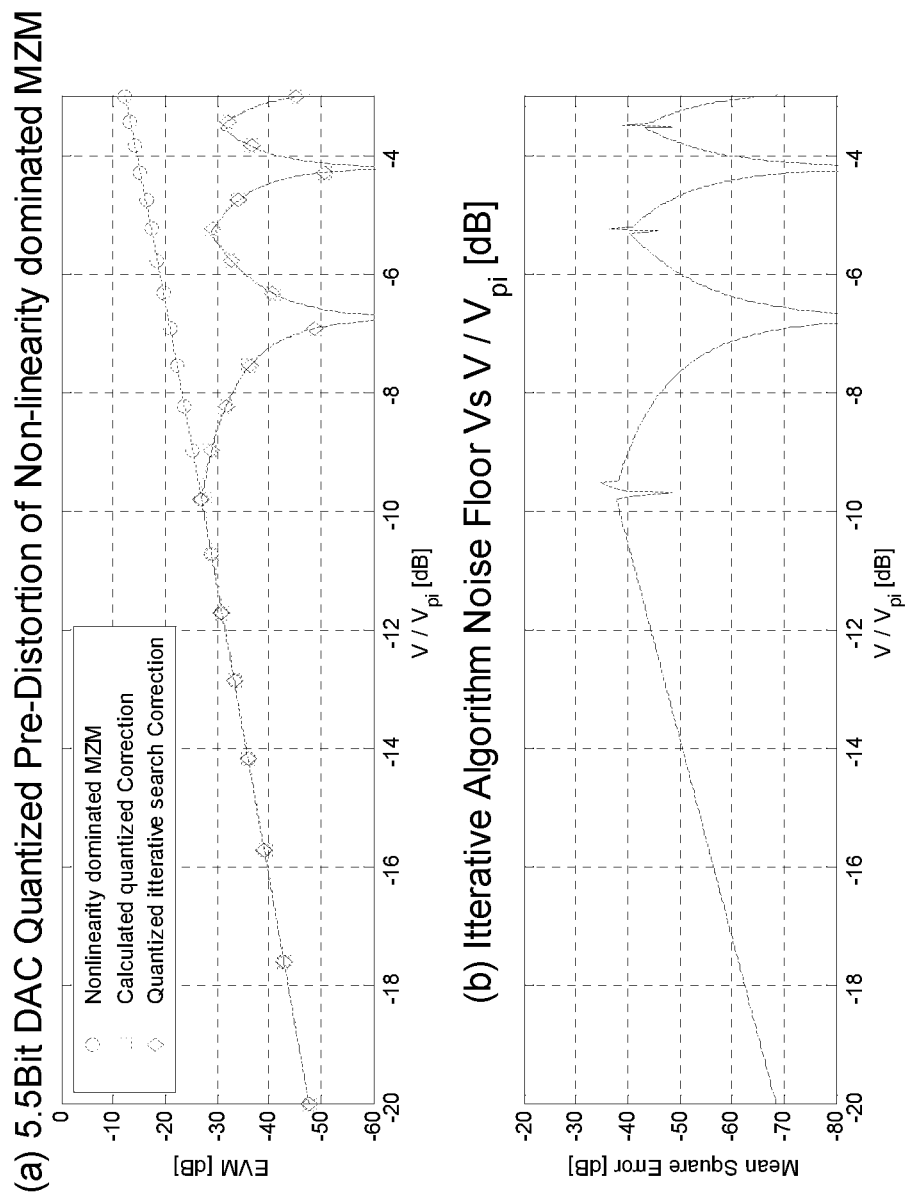
FIG. 11 illustrates the accuracy of iterative search in respect to the calculated value for a 5.5 bit DAC quantized correction.

FIG. 11a shows a comparison between the iterative trust region search and the analytic solution of the quantized correction in a nonlinearity dominated MZM. In FIG. 11b shows the noise floor which is added to the solution by the trust region algorithm is presented as a function of the relative voltage $V(t)/V_\pi$. It can be seen that the iterative search adds a noise floor of ~15 dB below the corrected impairment noise floor, which has a negligible effect on overall performance. Thus the trust region method can provide a reliable tool for optimizing the iDPD parameters when only an approximation of the actual distortion is available.

The simulation showed that there are only specific relative voltage $V(t)/V_\pi$ values in which the distortion can be fully compensated for, and that for other relative voltages, there is a minimum noise floor contribution that can be assured, limited only by the DAC quantization noise and can be well estimated by [10-6N]dB for a DAC with N effective number of bits.

The method was also tested on various distortions applied to a QAM-16 signal which showed that the required OSNR when applying a 5.5 bits correction DAC to a Polarization Division Multiplexing of 16 QAM (PDM-QAM-16) noise floor with strong FEC and a target of 19.8 dB OSNR can be improved in 5~8 dB on the extreme high power cases.

When the parameters of the MZM distortion are not known, or can only be approximated, an iterative search based on the trust region algorithm has been proposed. The algorithm uses the preliminary linear approximation to the iDPD basic equations as the initial condition for the search.

It was shown that the algorithm has the potential to contribute less than 0.1 dB to the optimal EVM when it fully converges.

The iDPD analysis can be extended to consider the limited bandwidth of MZM driver. Considering the driver BW would result in a linear dependency between symbols, and thus the analytically calculated iDPD values applied on each symbol would be a combination of a linear function of the current and previous symbols.

In order to overcome the limitations of prior art, the present invention proposes a new pre-distortion method, based on adding an imbalance symmetrically to the information applied to the MZM arms. The imbalance pre-distorts the signal in a way that the overall effect of the symmetric imbalance and MZM impairments is minimized by means of mean square error.

Although embodiments of the invention have been described by way of illustration, it will be understood that the invention may be carried out with many variations, modifications, and adaptations, without exceeding the scope of the claims.

REFERENCES

[1] G. L. Li and P. K. L. Yu, "Optical intensity modulators for digital and analog applications," in Journal of Lightwave Technology, vol. 21, no. 9, pp. 2010-2030, Sept. 2003.

[2] T. Sakamoto, A. Chiba and T. Kawanishi, "50-Gb/s 16 QAM by a quad-parallel Mach-Zehnder modulator," Optical Communication—Post-Deadline Papers (published 2008), 2007 33rd European Conference and Exhibition of, Berlin, Germany, 2007, pp. 1-2.

[3] W. Heni et al., "108 Gbit/s Plasmonic Mach-Zehnder Modulator with >70-GHz Electrical Bandwidth," in Journal of Lightwave Technology, vol. 34, no. 2, pp. 393-400, Jan. 15, 15 2016.

[4] C. Y. Wong et al., "Silicon IQ Modulator for Next-Generation Metro Network," in Journal of Lightwave Technology, vol. 34, no. 2, pp. 730-736, Jan. 15, 15 2016.

[5] Bao, Yuan; Li, Zhaohui; Li, Jianping; Feng, Xinhuan; Guan, Bai-ou; Li, Guifang, "Nonlinearity mitigation for high-speed optical OFDM transmitters using digital pre-distortion ",Optics Express, vol 21, no. 6, pp 7354-7361, 2013

[6] K. P. Ho." phase Modulated Optical Communication Systems. New York: Springer, 2005

[7] O. Omomukuyo, M. P. Thakur and J. E. Mitchell, "Experimental demonstration of the impact of MZM non-linearity on direct-detection optical OFDM," 2012 IEEE Wireless Communications and Networking Conference (WCNC), Shanghai, 2012, pp. 3753-3757.

[8] M. Thian and V. Fusco, "Power back-off behaviour of high-efficiency power-combining Class-E amplifier," 2011 German Microwave Conference, Darmstadt, 2011, pp. 1-4.

[9] Jun Sung Park, Sung Ryul Park, Hee Jung Roh and Kyung Heon Koo, "Power amplifier back-off analysis with AM-to-PM for millimeter-wave OFDM wireless LAN," Radio and Wireless Conference, 2001. RAWCON 2001. IEEE, Waltham, Mass., 2001, pp. 189-192.

[10] Y. London and D. Sadot, "Nonlinear Effects Mitigation in Coherent Optical OFDM System in Presence of High Peak Power," in Journal of Lightwave Technology, vol. 29, no. 21, pp. 3275-3281, Nov. 1, 2011.

[11] D. J. Fernandes Barros and J. M. Kahn, "Optical Modulator Optimization for Orthogonal Frequency-Division Multiplexing," in Journal of Lightwave Technology, vol. 27, no. 13, pp. 2370-2378, Jul. 1, 2009.

[12] O. Omomukuyo, M. P. Thakur and J. E. Mitchell, "Experimental demonstration of digital predistortion for linearization of Mach-Zehnder modulators in direct-detection MB-OFDM ultra-wideband over fiber systems," Communications and Photonics Conference (ACP), 2012 Asia, Guangzhou, 2012, pp. 1-3

[13] A. Napoli, M. M. Mezghanni, D. Rafique, V. A. J. M. Sleiffer, B. Spinnler and M. Bohn, "Novel digital pre-distortion techniques for low-extinction ratio Mach-Zehnder modulators," Optical Fiber Communications Conference and Exhibition (OFC), 2015, Los Angeles, Calif., 2015, pp. 1-3.

[14] W. R. Peng, B. Zhang, X. Wu, K. M. Feng, A. E. Willner and S. Chi, "Compensation for I/Q Imbalances and Bias Deviation of the Mach-Zehnder Modulators in Direct-Detected Optical OFDM Systems," in IEEE Photonics Technology Letters, vol. 21, no. 2, pp. 103-105, Jan. 15, 2009.

[15] Wonzoo Chung, "Transmitter IQ mismatch compensation in coherent optical OFDM systems using pilot signals," Opt. Express 18, 21308-21314 (2010)

[16] Yabo, Li "In-Phase and Quadrature Imbalance, Modeling, Estimation and Compensation", Springer, 2014

[17] H. Cao, A. Soltani Tehrani, C. Fager, T. Eriksson and H. Zirath, "I/Q Imbalance Compensation Using a Nonlinear Modeling Approach," in *IEEE Transactions on Microwave Theory and Techniques*, vol. 57, no. 3, pp. 513-518, March 2009

[18] Pei-Pei Zhou, Qing-Hua Zhou, Yue Yang and Yue Wang, "A hybird algorithm of two kinds of trust region methods," Operations Research and its Applications in Engineering, Technology and Management 2013 (ISORA 2013), 11th International Symposium on, Huangshan, 2013, pp. 1-4.

[19] M. J. D. Powell. "A new algorithm for unconstrained optimization" in: J. B. Rosen, O. L. Mangasarian, K. Ritter, eds. Nonlinear Programming, New York Academic Press, 1970.

[20] Oppenheim, Alan V.; Schafer. R. W.: and Buck, J. R. (1999). Discrete-time signal processing. Upper Saddle River, N.J.: Prentice Hall. ISBN 0-13-754920-2.

[21] N. Eiselt et al., "First real-time 400G PAM-4 demonstration for inter-data center transmission over 100 km of SSMF at 1550 nm," 2016 *Optical Fiber Communications Conference and Exhibition (OFC)*, Anaheim, Calif., 2016, pp. 1-3

The invention claimed is:

1. A method for compensating the distortions introduced by impairments of MZMz implementing an optical transmitter, comprising:
   a) measuring the level of total amplitude and phase distortions caused by said optical transmitter;
   b) optimizing all impairments in the constellation domain by pre-distorting the input signal to be transmitted by symmetrically adding imbalance to the voltage applied to the MZM arms, said imbalance is determined by:
   c) introducing a phase rotation in either I or in the Q path of said optical transmitter, which compensates said total amplitude distortion by independently providing different control voltages to the inputs of each MZM, thereby applying a Q-imbalance being a distortion applied in Q MZM or by applying an I-imbalance being a distortion applied in I MZM, to rotate the signal from the distorted constellation point to a new point, which is on the same power equivalent circle as the target point; and
   d) introducing a phase rotation to both I and Q paths of said optical transmitter by independently providing different control voltages to the inputs of each MZM, thereby, applying a common imbalance on both I MZM and Q MZM, to rotate the signal from said new point to said target point, which compensates said total phase distortion and the phase shift caused by compensating said amplitude distortion, until reaching a desired operating point, which corresponds to the level of pre-distortion.

2. The method according to claim 1, wherein the geometric distance between distorted locations and the target constellation points, being the desired points in the signal space, at which all distortions are compensated, is represented by an Error Vector Magnitude (EVM).

3. The method according to claim 2, wherein the MZM output Error Vector Magnitude (EVM) is bounded by 10-6N [dB].

4. The method according to claim 1, wherein pre-distortion is determined by the number of bits N of digital to analog converter providing voltage to said MZM.

5. The method according to claim 4, wherein the absolute value of the Error Vector Magnitude (EVM) is bounded by 10-6N [dB], where N is the effective number of bits of the digital to analog converter used for driving the signal to the MZM.

6. The method according to claim 1, wherein impairments include one or more of the following:
   nonlinearity;
   single MZM gain imbalance;
   single MZM phase imbalance;
   dual MZM gain imbalance dual MZM phase imbalance; and
   any frequency independent impairment.

7. The method according to claim 1, wherein optimization is conducted using means of mean square criterion.

8. The method according to claim 1, wherein pre-distortion is performed by generating a distorted transfer function consisting of a common $y_{mzmCom}(t)$ signal, and an imbalanced signal $y_{mzmIm}(t)$ which are defined as $$y_{MZM}(t) = \underbrace{G_{MZM} \cdot \sin\left(\frac{\pi}{2V_\pi} \cdot V(t)\right)}_{Y_{mzmCom}(t)} \cdot \underbrace{e^{-j\left(\frac{\pi}{2V_\pi} \cdot \Delta(t)\right)}}_{Y_{mzmIm}(t)}. \quad (12)$$

9. The method according to claim 1, wherein pre-distortion of each MZM is performed by generating a distorted transfer function consisting of a common $y_{mzmCom}(t)$ signal, and an imbalanced signal $y_{mzmIm}(t)$ and defined as $$y_{mzmD}(t) = \underbrace{G_{MZM} \frac{1}{2}\left(e^{-j\left(\frac{\pi V(t)}{2V_\pi}\right)} + G_{ab} \cdot e^{-j\left(\frac{\pi V(t)}{2V_\pi} + P_a b\right)}\right)}_{Y_{mzmDcom}(t)} \cdot \underbrace{e^{-j\left(\frac{\pi}{2V_\pi} \cdot \Delta(t)\right)}}_{Y_{mzmDim}(t)}. \quad (13)$$

10. The method according to claim 1, wherein pre-distortion of in-phase and quadrature MZM is performed by generating a distorted transfer function consisting of a common $y_{mzmIDcom}(t)/y_{mzmQDcom}(t)$ and imbalance $y_{mzmIDim}(t)/y_{mzmQDim}(t)$ components and defined by:

$$y_{mzmIQD}(t) = \underbrace{y_{mzmIDcom}(t) \cdot e^{-j\left(\frac{\pi}{2V_\pi} \cdot \Delta_I(t)\right)}}_{Y_{mzmIDim(t)}} + \qquad (14)$$

$$j \cdot G_{IQ} \cdot e^{j\varphi_{IQ}} \cdot \underbrace{y_{mzmQDcom}(t) \cdot e^{-j\left(\frac{\pi}{2V_\pi} \cdot \Delta_Q(t)\right)}}_{Y_{mzmQDim(t)}},$$

wherein each component results in a constellation rotation around a point on one of the axes.

11. The method according to claim 1, wherein the imbalance is added symmetrically to the transmitted symbol.

12. The method according to claim 1, further comprising generating a metric of performance in the form of an Error Vector Magnitude (EVM), being the geometric distance between distorted locations and the target constellation points in the signal space and defined by:

$$EVM = 10 \cdot \text{Log}_{10}\left(\frac{E(y_{mzmIDQ}(n) - k_{MZM} V_{IQ}(n))^2}{E((k_{MZM} V_{IQ}(n))^2)}\right).$$

13. The method according to claim 1, wherein a push-pull configuration is assumed when $\Delta_I = \Delta_Q = 0$, said a push-pull configuration is optimal when there are no distortions.

14. The method according to claim 1, wherein the optimal EVM value is achieved with non-zero imbalance.

15. The method according to claim 1, wherein a complex imbalance is used for moving the signal from the distorted constellation point $\{I_0, Q_0\}$ to the target constellation point $\{Ic, Qc\}$ by:

a) applying either a Q-imbalance being a distortion applied in Q MZM only value or I-imbalance being a distortion applied in I MZM only value, and rotating from the distorted constellation point $\{I_0, Q_0\}$ to a new point $\{I_1, Q_1\}$, which is on the same power equivalent circle as the target point $\{Ic, Qc\}$;

b) applying a common imbalance on both I and Q rotating the signal from $\{I_1, Q_1\}$ to $\{I_c, Q_c\}$.

* * * * *